(12) United States Patent
Kitamura et al.

(10) Patent No.: US 6,934,074 B2
(45) Date of Patent: Aug. 23, 2005

(54) OPTICAL ELEMENT AND MANUFACTURING METHOD THEREOF

(75) Inventors: Mitsuru Kitamura, Tokyo (JP); Tomohisa Hamano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/623,038

(22) Filed: Jul. 18, 2003

(65) Prior Publication Data

US 2004/0145789 A1 Jul. 29, 2004

Related U.S. Application Data

(62) Division of application No. 09/932,006, filed on Aug. 17, 2001, now Pat. No. 6,618,190.

(30) Foreign Application Priority Data

Sep. 1, 2000 (JP) .................................. 2000-265042

(51) Int. Cl.[7] ................................................ G02F 1/00
(52) U.S. Cl. ......................... 359/321; 359/11; 359/238
(58) Field of Search ........................... 359/315–6, 238, 359/259, 276, 279, 298, 11, 321

(56) References Cited

U.S. PATENT DOCUMENTS

| | | | |
|---|---|---|---|
| 3,957,353 A | 5/1976 | Fienup et al. | ............... 350/162 |
| 4,109,996 A | 8/1978 | Ersoy | .................. 350/3.66 |
| 5,285,308 A | 2/1994 | Jenkins et al. | ............... 359/260 |
| 5,497,254 A | 3/1996 | Amako et al. | ................ 349/74 |
| 5,751,243 A | 5/1998 | Turpin | .......................... 342/179 |
| 5,949,569 A | * 9/1999 | Shimura | ..................... 359/254 |
| 6,026,053 A | * 2/2000 | Satorius | ...................... 365/235 |

FOREIGN PATENT DOCUMENTS

EP 0195327 9/1986

OTHER PUBLICATIONS

Jenkins, F., et al., *Fundamentals of Optics*, fourth ed., McGraw–Hill, 2001, p. 665.

* cited by examiner

Primary Examiner—Jordan M. Schwartz
Assistant Examiner—Jessica Stultz
(74) Attorney, Agent, or Firm—Ladas & Parry LLP

(57) ABSTRACT

An optical element has of a set a plurality of three-dimensional cells. A specific amplitude and a specific phase are defined in each individual cell. Each cell has a concave part formed by hollowing a part having an area corresponding to the specific amplitude by a depth corresponding to the specific phase. The individual cell has a specific optical property so that, when incident light is provided to the cell, emission light is obtained by changing an amplitude and a phase of the incident light in accordance with the specific amplitude and specific phase defined in the cell.

9 Claims, 11 Drawing Sheets n1~n4:REFRACTIVE INDEX

TRANSMISSION TYPE CELL : C (x,y)

◎ MAXIMUM DEPTH OF GROOVE G : $d_{max} = \dfrac{\lambda}{|n1 - n2|}$

◎ DEPTH OF GROOVE G FOR A SPECIFIC CELL C(x,y) :

(1) IF $n1 > n2$ $$d(x,y) = \frac{\lambda \cdot \theta(x,y)}{2(n1-n2)\pi}$$

(2) IF $n1 < n2$ $$d(x,y) = d_{max} - \frac{\lambda \cdot \theta(x,y)}{2(n2-n1)\pi}$$

FIG. 1 3

REFLECTION TYPE CELL : C (x,y)

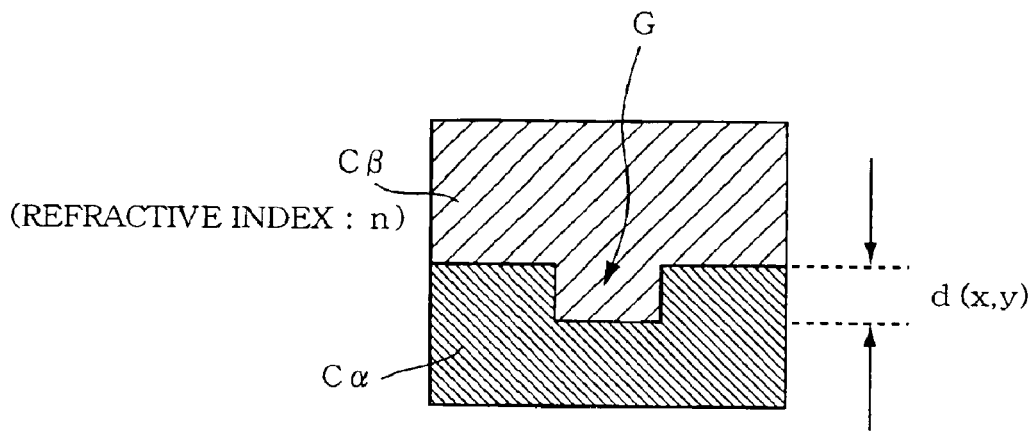

◎ MAXIMUM DEPTH OF GROOVE G : $d_{max} = \dfrac{\lambda}{2n}$

◎ DEPTH OF GROOVE G FOR A SPECIFIC CELL C(x,y) :

$$d(x,y) = \dfrac{\lambda \cdot \theta(x,y)}{4n\pi}$$

ESPECIALLY, WHEN PROTECTIVE LAYER C β IS REPLACED BY AIR LAYER, APPROXIMATION n = 1 IS MADE.

◎ MAXIMUM DEPTH OF GROOVE G : $d_{max} = \dfrac{\lambda}{2}$

◎ DEPTH OF GROOVE G FOR A SPECIFIC CELL C(x,y) :

$$d(x,y) = \dfrac{\lambda \cdot \theta(x,y)}{4\pi}$$

US 6,934,074 B2

OPTICAL ELEMENT AND MANUFACTURING METHOD THEREOF

This application is a divisional of application Ser. No. 09/932,006 filed on Aug. 17, 2001, now U.S. Pat. No. 6,618,190, claims the benefit thereof and incorporates the same by reference.

BACKGROUND OF THE INVENTION

The present invention relates to an optical element and a manufacturing method thereof and, more particularly, relates to an optical element capable of recording a stereoscopic image as a hologram and reconstructing the image, and a manufacturing method thereof.

A holographic technique is conventionally known as a method for recording a stereoscopic image on a medium and reconstructing this image. A hologram produced by this method is used in various fields, such as ornamental art or anti-counterfeit seals. In order to optically produce the hologram, it is common to record the interference fringe between object light reflected from an object and reference light on a photosensitive medium. A laser beam superior in coherence is usually used as a light source for the object light and the reference light. Generally, the motion of electromagnetic radiation, such as light, can be regarded as the propagation of a wave front provided with amplitude and a phase, and it can be said that the hologram is an optical element that functions to reconstruct such a wave front. Therefore, it is necessary to record information for accurately reconstructing the amplitude and phase of the object light at each position in space on the recording medium of the hologram. If interference fringes generated by the object light and the reference light are recorded on the photosensitive medium, information that includes both the phase and the amplitude of the object light can be recorded, and, by projecting illumination reconstructing light equivalent to the reference light onto the medium, a part of the illumination reconstructing light can be observed as light provided with a wave front equivalent to the object light.

If the hologram is produced by an optical method using a laser beam or the like in this way, the phase and amplitude of the object light can be recorded only as interference fringes resulting from interference between the object light and the reference light. The reason is that the photosensitive medium has a property of being photosensitized in accordance with light intensity. On the other hand, a technique of producing a hologram by computations with use of a computer has recently been put to practical use. This technique is called a "CGH" (Computer-Generated Hologram) method, in which the wave front of object light is calculated by use of a computer, and its phase and its amplitude are recorded on a physical medium according to a certain method so as to produce a hologram. The employment of this computational holography, of course, enables the recording of an image as interference fringes between object light and reference light, and, in addition, enables the recording of information for the phase and amplitude of the object light directly onto a recording surface without using the reference light. For example, a recording method has been proposed in which an amplitude is represented by the size of an opening formed in a recording medium whereas a phase is represented by the position of the opening or in which a medium is made up of two recording layers on one of which an amplitude is recorded and on the other one of which a phase is recorded.

The method for recording an image as interference fringes that has been widely used as an optical hologram producing method is at an advantage in that productivity is high because, in general, a reconstructed image with high resolution can be obtained and because an optical method is used, but it is at a disadvantage in that an image darkens because diffraction efficiency by interference fringes is poor when reconstructed. By contrast, the method for recording the phase and amplitude of object light directly onto a medium that has been proposed as one of the computer-generated hologram methods is at an advantage in that high diffraction efficiency can be obtained, but it is at a disadvantage in that, practically, productivity decreases because the recording of the phase and the amplitude onto the medium is technically difficult.

SUMMARY OF THE INVENTION

It is therefore an object of the present invention to provide an optical element that can obtain high diffraction efficiency when reconstructed and that is excellent in productivity.

(1) The first feature of the present invention resides in an optical element consisting of a set of a plurality of three-dimensional cells, wherein:

a specific amplitude and a specific phase are defined in each individual cell, and the individual cell has a specific optical property so that, when incident light is provided to the cell, emission light is obtained by changing an amplitude and a phase of the incident light in accordance with the specific amplitude and the specific phase defined in the cell.

(2) The second feature of the present invention resides in the optical element according to the first feature, wherein each cell has an amplitude-modulating part provided with transmittance corresponding to a specific amplitude.

(3) The third feature of the present invention resides in the optical element according to the first feature, wherein each cell has an amplitude-modulating part provided with reflectivity corresponding to a specific amplitude.

(4) The fourth feature of the present invention resides in the optical element according to the first feature, wherein each cell has an amplitude-modulating part provided with an effective area corresponding to a specific amplitude.

(5) The fifth feature of the present invention resides in the optical element according to the first to the fourth features, wherein each cell has a phase-modulating part provided with a refractive index corresponding to a specific phase.

(6) The sixth feature of the present invention resides in the optical element according to the first to the fourth features, wherein each cell has a phase-modulating part provided with an optical path length corresponding to a specific phase.

(7) The seventh feature of the present invention resides in the optical element according to the first feature, wherein each cell has a concave part formed by hollowing a part provided with an area corresponding to a specific amplitude by a depth corresponding to a specific phase.

(8) The eighth feature of the present invention resides in the optical element according to the first feature, wherein each cell has a convex part formed by protruding a part provided with an area corresponding to a specific amplitude by a height corresponding to a specific phase.

(9) The ninth feature of the present invention resides in the optical element according to the seventh or eighth feature, wherein a surface where the concave part or the convex part of each cell is formed serves as a reflecting surface, and incident light provided to the cell is reflected by the reflecting surface and thereby turns into emission light.

(10) The tenth feature of the present invention resides in the optical element according to the seventh or eighth feature, wherein each cell includes a main body layer having a concave part or a convex part and a protective layer with which a surface where the concave part or the convex part of the main body layer is formed is covered, and the main body layer and the protective layer are made of materials different from each other.

(11) The eleventh feature of the present invention resides in the optical element according to the tenth feature, wherein the main body layer and the protective layer are made of transparent materials different in a refractive index from each other, and incident light provided to the cell passes through the main body layer and the protective layer and thereby turns into emission light.

(12) The twelfth feature of the present invention resides in the optical element according to the tenth feature, wherein a boundary between the main body layer and the protective layer forms a reflecting surface, and incident light provided to the cell is reflected by the reflecting surface and thereby turns into emission light.

(13) The thirteenth feature of the present invention resides in the optical element according to the first to the twelfth features, wherein each cell is arranged one-dimensionally or two-dimensionally.

(14) The fourteenth feature of the present invention resides in the optical element according to the thirteenth feature, wherein a longitudinal pitch of each cell and a lateral pitch of each cell are arranged so as to be an equal pitch.

(15) The fifteenth feature of the present invention resides in the optical element according to the first to the fourteenth features, wherein a complex amplitude distribution of object light from an object image is recorded so that the object image is reconstructed when observed from a predetermined viewing point so as to be usable as a hologram.

(16) The sixteenth feature of the present invention resides in a method for manufacturing an optical element where a predetermined object image is recorded, the method comprising:

a cell defining step of defining a set of a plurality of three-dimensional virtual cells;

a representative-point defining step of defining a representative point for each virtual cell;

an object image defining step of defining an object image to be recorded;

an amplitude phase defining step of defining a specific amplitude and a specific phase in each virtual cell by calculating a complex amplitude at a position of each representative point of object light emitted from the object image; and a physical cell forming step of replacing each virtual cell with a real physical cell and forming an optical element that consists of a set of three-dimensional physical cells;

wherein, at the physical cell forming step, when predetermined incident light is given to each physical cell, replacement is carried out by each physical cell having a specific optical property so as to obtain emission light that has changed an amplitude and a phase of the incident light in accordance with a specific amplitude and a specific phase defined in the virtual cell corresponding to the physical cell.

(17) The seventeenth feature of the present invention resides in the manufacturing method for the optical element according to the sixteenth feature, wherein at the cell defining step, a cell set is defined by arranging block-like virtual cells one-dimensionally or two-dimensionally.

(18) The eighteenth feature of the present invention resides in the manufacturing method for the optical element according to the sixteenth or seventeenth feature, wherein at the amplitude phase defining step, a plurality of point light sources are defined on the object image, and object light of a spherical wave having a predetermined amplitude and a predetermined phase is regarded as being emitted from each point light source, and a totaled complex amplitude of the object light from the point light sources at a position of each representative point is calculated at a predetermined standard time.

(19) The nineteenth feature of the present invention resides in the manufacturing method for the optical element according to the eighteenth feature, wherein K point light sources that emit object light whose wavelength is $\lambda$ are defined on the object image, and if an amplitude of object light emitted from a k-th point light source O(k) (k=1 to K) is represented as Ak, and a phase thereof is represented as $\theta$k, and a distance between a predetermined representative point P and the k-th point light source O(k) is represented as rk, a totaled complex amplitude of the object light from the K point light sources at the predetermined representative point P is calculated as follows:

$$\Sigma_{(k=1,K)}(Ak/rk \cdot \cos(\theta k \pm 2\pi rk/\lambda) + iAk/rk \cdot \sin(\theta k \pm 2\pi rk/\lambda)).$$

(20) The twentieth feature of the present invention resides in the manufacturing method for the optical element according to the sixteenth to nineteenth features, wherein, at the physical cell forming step, each virtual cell is replaced with a physical cell having a concave part formed by hollowing a part provided with an area corresponding to a specific amplitude by a depth corresponding to a specific phase.

(21) The twenty-first feature of the present invention resides in the manufacturing method for the optical element according to the sixteenth to nineteenth features, wherein, at the physical cell forming step, each virtual cell is replaced with a physical cell having a convex part formed by protruding a part provided with an area corresponding to a specific amplitude by a height corresponding to a specific phase.

(22) The twenty-second feature of the present invention resides in the manufacturing method for the optical element according to the twentieth or twenty-first feature, wherein:

a refractive index of a material filled in the concave part of the physical cell or a material that constitutes the convex part is represented as n1, a refractive index of another material in contact with the material n1 is represented as n2, a wavelength of object light is represented as $\lambda$, a maximum depth dmax of the concave part or a maximum height dmax of the convex part is set to be dmax=$\lambda$/|n1−n2|, a depth or height d corresponding to a specific phase $\theta$ is determined by the expression d=$\lambda \cdot \theta$/2(n1−n2)$\pi$ when n1>n2, and is determined by the expression d=dmax−$\lambda \cdot \theta$/2(n2−n1)$\pi$ when n1<n2, and an object image is reconstructed by transmission light that has passed through the concave part or the convex part.

(23) The twenty-third feature of the present invention resides in the manufacturing method for the optical element according to the twentieth or twenty-first feature, wherein:

a refractive index of a material filled in the concave part of the physical cell or a material that constitutes the convex part is represented as n, a wavelength of object light is represented as $\lambda$, a maximum depth of the concave part or a maximum height dmax of the convex part is set to be dmax=$\lambda$/2n, a depth or a height d corresponding to the specific phase $\theta$ is determined by the expression d=$\lambda \cdot \theta$/4n$\pi$, and an object image is reconstructed by reflected light that has been reflected by the boundary of the concave part or the convex part.

(24) The twenty-fourth feature of the present invention resides in the manufacturing method for the optical element according to the twentieth to twenty-third features, wherein α kinds of a plurality of areas are defined as areas corresponding to a specific amplitude, β kinds of a plurality of depths or heights are defined as depths or heights corresponding to a specific phase so as to prepare α×β kinds of physical cells in total, and each virtual cell is replaced with a physical cell closest in a necessary optical property among said physical cells.

(25) The twenty-fifth feature of the present invention resides in the manufacturing method for the optical element according to the sixteenth to twenty-fourth features, further comprising a phase-correcting step of correcting the specific phase defined for each virtual cell in consideration of a direction of illumination light projected when reconstructed or in consideration of a position of a viewing point when reconstructed.

(26) The twenty-fifth feature of the present invention resides in the manufacturing method for the optical element according to the sixteenth to twenty-fifth features, wherein:

at the cell defining step, a cell set of virtual cells arranged on a two-dimensional matrix is defined by arranging the virtual cells horizontally and vertically, at the amplitude phase defining step, a plurality of M point light source rows that are each extended in a horizontal direction and are mutually disposed in a vertical direction are defined on an object image, and M groups in total are defined by defining virtual cells that belong to a plurality of rows contiguous in the vertical direction in the two-dimensional matrix as one group, the M point light source rows and the M groups are caused to correspond to each other in accordance with an arrangement order relative to the vertical direction, and a totaled complex amplitude at a position of each representative point is calculated on a supposition that object light emitted from a point light source in an m-th point light source row (m=1 to M) reaches only virtual cells that belongs to an m-th group.

BRIEF DESCRIPTION OF THE DRAWINGS

FIG. 13 shows the relationship between the refractive index and the groove depth of each part for the reflection type cell C(x, y).

DETAILED DESCRIPTION OF THE PREFERRED EMBODIMENTS

The present invention will be hereinafter described on the basis of the embodiments shown in the figures.

§ 1. Basic Principle of the Present Invention

Figure 1:
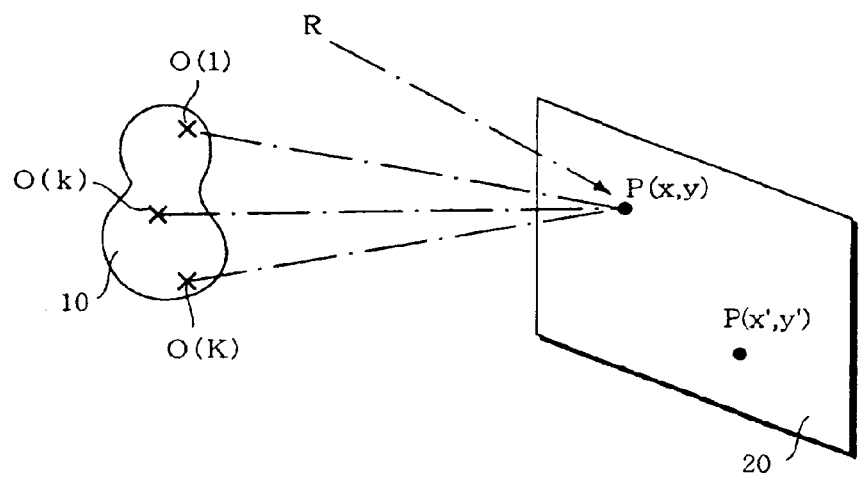
FIG. 1 is a perspective view showing general holography for optically recording an object image as interference fringes by use of reference light.

FIG. 1 is a perspective view that shows general holography in which an object image is optically recorded as interference fringes by use of reference light. When a stereoscopic image of an object 10 is recorded onto a recording medium 20, the object 10 is illuminated with light (normally, with a laser beam) having the same wavelength as reference light R, and interference fringes formed by object light from the object 10 and the reference light R on the recording medium 20 are recorded. Herein, if an XY coordinate system is defined on the recording medium 20, and attention is paid to an arbitrary point P(x, y) located at coordinates (x, y), the amplitude intensity of a composite wave resulting from interference between each object light from each point O(1), O(2), ..., O(k), ..., O(K) located on the object 10 and the reference light R will be recorded onto the point P(x, y). Likewise, the amplitude intensity of the composite wave resulting from the interference between the object light from each point and the reference light R will be recorded onto another point P(x',y') on the recording medium 20. However, since a difference in the propagation distance of light exists, the amplitude intensity recorded onto the point P(x, y) and the amplitude intensity recorded onto the point P(x',y') are different from each other. As a result, an amplitude intensity distribution is recorded onto the recording medium 20, and the amplitude and phase of the object light are expressed by this amplitude intensity distribution. When reconstructed, reconstructing illumination light having the same wavelength as the reference light R is projected from the same direction as that of the reference light R (or, alternatively, from a direction that has a plane symmetry with respect to the recording medium 20), and thus a stereoscopic reconstructed image of the object 10 is obtained.

In order to record interference fringes onto the recording medium 20 according to an optical method, a photosensitive material is used as the recording medium 20, and interference fringes are recorded as a light and dark pattern on the recording medium 20. On the other hand, if the computer-generated hologram method is used, a phenomenon occurring in the optical system shown in FIG. 1 requires simulation on a computer. Specifically, the object image 10 and the recording surface 20 are defined in a virtual three-dimensional space on the computer instead of the real object 10 or the real recording medium 20, and many point light sources O(1), O(2), ..., O(k), ..., O(K) are defined on the object image 10. Further, object light (i.e., spherical wave) with a predetermined wavelength, amplitude, and phase is defined for each point light source, and reference light with the same wavelength as the object light is defined. On the other hand, many representative points P(x, y) are defined on the recording surface 20, and the amplitude intensity of a composite wave of both the object light and the reference light that reach the position of each representative point is calculated. Since an amplitude intensity distribution (i.e., interference fringes) is obtained on the recording surface 20 by computation, a physical hologram recording medium can be formed if the amplitude intensity distribution is recorded onto the physical recording medium in the form of a light/dark distribution or as a concave/convex distribution.

In fact, the interference fringes are not necessarily required to be recorded by using the reference light R if the computer-generated hologram method is used. It is also possible to record the object light from the object image 10 directly onto the recording surface 20. In more detail, when a hologram is optically generated, it is necessary to generate an interference wave on the recording medium 20 made of a photosensitive material during a fixed period of time needed for exposure and to record this wave as interference fringes. Therefore, it is necessary to generate an interference wave that turns to a standing wave by use of reference light. However, if the computer-generated hologram method is used, the state of the wave at a certain moment that exists on the recording surface 20 can be observed in such a way as if a lapse in time is stopped, and this wave can be recorded. In other words, the amplitude and phase of the object light at the position of each representative point on the recording surface 20 at a predetermined standard time can be obtained by calculation. In the present invention, this advantage in a computer-generated hologram is employed, and the method for directly recording the amplitude and phase of the object light is used without using the method for recording the object light as interference fringes resulting from cooperation with the reference light.

Figure 2:
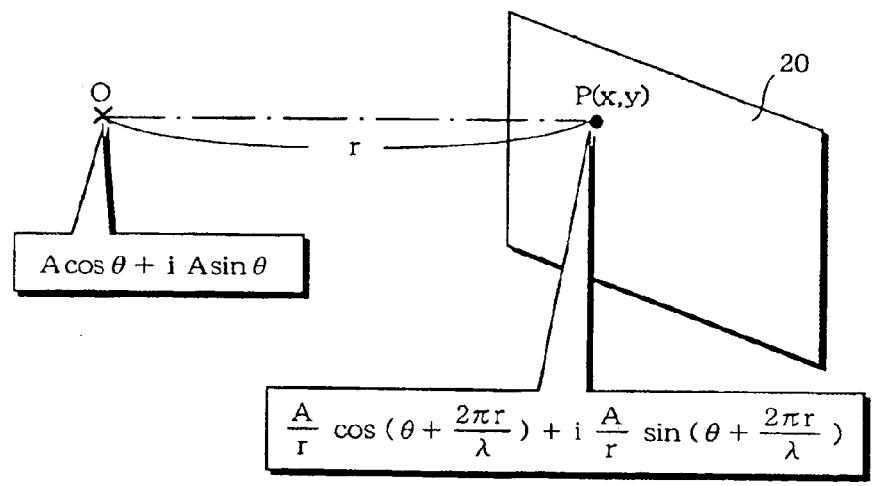
FIG. 2 is a perspective view showing the amplitude and phase of object light that has reached a representative point P(x, y) on a recording surface 20 when a point light source O and the recording surface 20 are defined.

Now let us consider how the amplitude and phase of the object light that has reached the representative point P(x, y) on the recording surface 20 are calculated when the point light source O and the recording surface 20 are defined as shown in, for example, the perspective view of FIG. 2. Generally, a wave motion in consideration of the amplitude and the phase is expressed by the following function of complex variable (i is an imaginary unit):

$$A \cos\theta + i A \sin\theta$$

Herein, A is a parameter showing the amplitude, and $\theta$ is a parameter showing the phase. Accordingly, if object light emitted from a point light source O is defined by the function $A \cos\theta + i A \sin\theta$, the object light at the position of a representative point P(x, y) is expressed by the following function of the complex variable:

$$A/r \cos(\theta + 2\pi r/\lambda) + i A/r \sin(\theta + 2\pi r/\lambda)$$

Herein, r is a distance between the point light source O and the representative point P(x, y), and $\lambda$ is a wavelength of the object light. The amplitude of the object light attenuates as the distance r becomes greater, and the phase depends on the distance r and the wavelength $\lambda$. This function does not have variables that indicate time. The reason is that this function is an expression showing the momentary state of a wave observed when a lapse in time is stopped at a predetermined standard time as described above.

Figure 3:
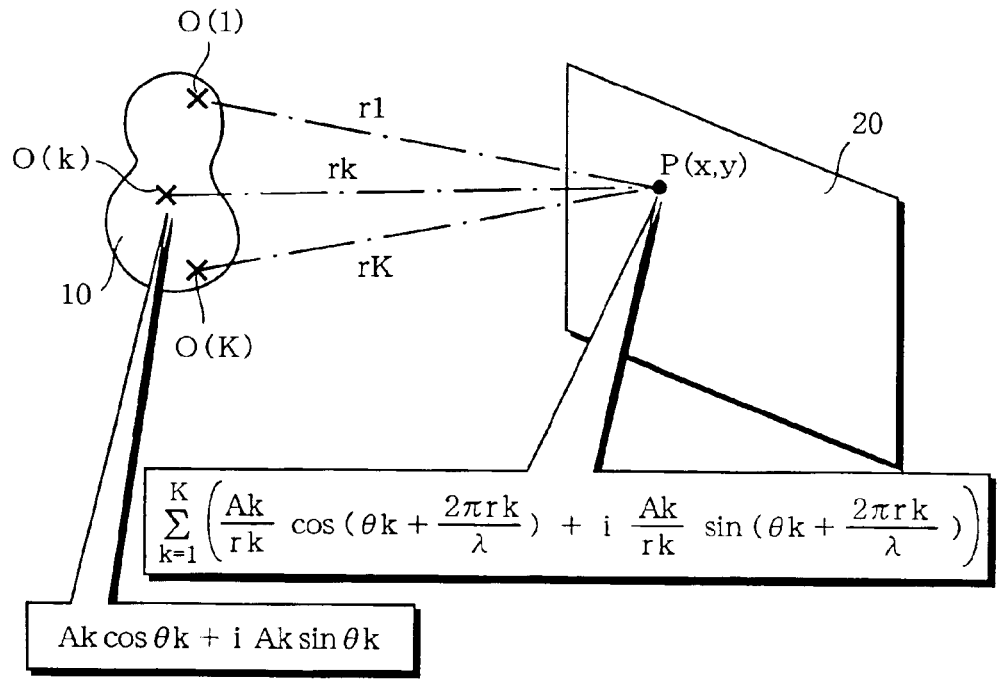
FIG. 3 is a perspective view showing the complex amplitude of object light at the position of the representative point P(x, y) when the object light emitted from each point light source on an object image 10 has reached the representative point P(x, y) on the recording surface 20.

Accordingly, in order to record information for the object image 10 onto the recording surface 20, many point light sources O(1), O(2), ..., O(k), ..., O(K) are defined on the object image 10 as shown in the perspective view of FIG. 3, and then the amplitude and phase of a composite wave of the object light emitted from each point light source are calculated at the position of each representative point on the recording surface 20, and the calculation result is recorded by a certain method. Let us now suppose that K point light sources in total are defined on the object image 10, and the object light emitted from the k-th ("-th" is a suffix indicating an ordinal number) point light source O(k) is expressed by the following function of the complex variable as shown in FIG. 3:

$$A_k \cos\theta_k + i A_k \sin\theta_k$$

If the object image 10 is constructed of a set of pixels each of which has a predetermined gradation value (concentration value), the parameter Ak showing the amplitude is fixed in accordance with the gradation value of a pixel which exists at the position of the point light source O(k). The phase $\theta_k$ is allowed to be defined generally as $\theta_k = 0$. However, it is also possible to create such a setting as to emit object light rays different in phase from each part of the object image 10 if necessary. When the object light expressed by the above function can be defined for each of all the K point light sources, the composite wave of all the K object light at the position of an arbitrary representative point P(x, y) on the recording surface 20 is expressed by the following function of the complex variable as shown in FIG. 3:

$$\Sigma_{k=1,K}(Ak/rk\ \cos(\theta k+2\pi rk/\lambda)+i\ Ak/rk\ \sin(\theta k+2\pi rk/\lambda))$$

Herein, rk is the distance between the k-th point light source O(k) and the representative point P(x, y). The above function corresponds to an expression that is used when the object image 10 is reconstructed at the back of the recording medium. When the object image 10 is reconstructed to rise to the front side of the recording medium, the function of the complex variable is merely calculated according to the following expression (note that the reference character in the term of the phase is negative):

$$\Sigma_{k=1,K}(Ak/rk\ \cos(\theta k-2\pi rk/\lambda)+i\ Ak/rk\ \sin(\theta k-2\pi rk/\lambda))$$

Therefore, the function of the complex variable in consideration of both situations is as follows:

$$\Sigma_{k=1,K}(Ak/rk\ \cos(\theta k\pm 2\pi rk/\lambda)+i\ Ak/rk\ \sin(\theta k\pm 2\pi rk/\lambda))$$

Figure 4:
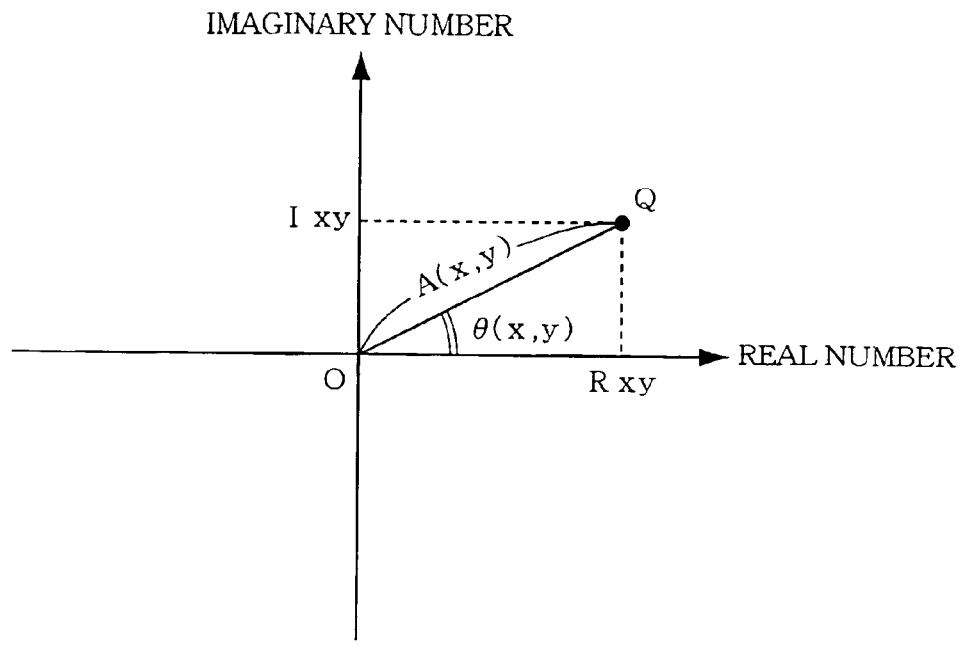
FIG. 4 shows the calculation of an amplitude A(x, y) and a phase θ(x, y) on the basis of a complex amplitude shown by a coordinate point Q on a complex coordinate plane.

If the form of Rxy+iIxy is taken under the condition that the real number part of this function is Rxy and the imaginary number part thereof is Ixy, the complex amplitude (i.e., amplitude in consideration of the phase) at the position of the representative point P(x, y) of this composite wave is shown by a coordinate point Q on the complex coordinate plane as shown in FIG. 4. After all, the amplitude of the composite wave of the object light at the representative point P(x, y) is given by the distance A(x, y) between the origin O and the coordinate point Q on the coordinate plane shown in FIG. 4, and the phase is given by the angle θ(x, y) between the vector OQ and the real number axis.

Thus, the amplitude A(x, y) and phase θ(x, y) of the composite wave of the object light at the position of the arbitrary representative point P(x, y) defined on the recording surface 20 is obtained by computation. Accordingly, the complex amplitude distribution (i.e., distribution of the amplitude and phase of the object-light-composite wave) of the object light emitted from the object image 10 is obtained on the recording surface 20. As a result, the object image 10 can be recorded as a hologram if the complex-amplitude distribution obtained in this way is recorded on a physical recording medium in some way so that the wave front of the object light is to be reconstructed and then predetermined reconstructing illumination light is given.

Figure 5:
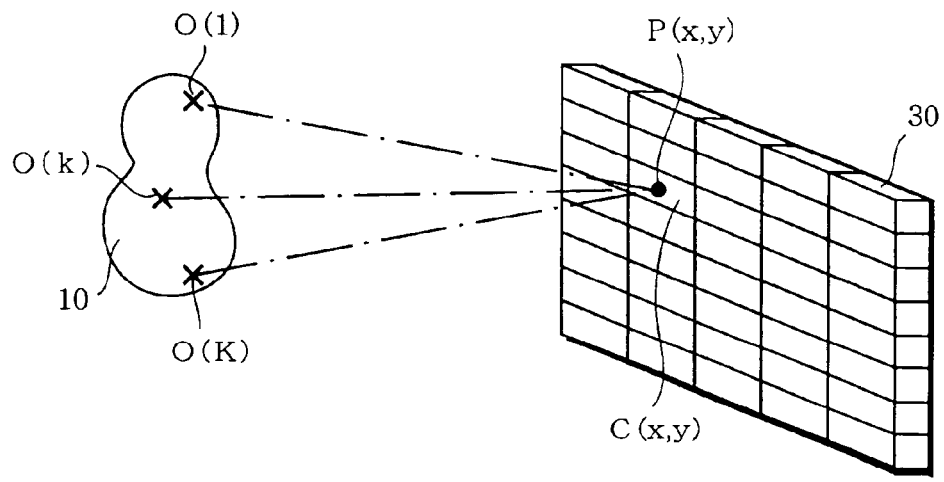
FIG. 5 is a perspective view showing one example of a three-dimensional virtual cell set 30 defined to record the object image 10.

In order to record a complex amplitude distribution of object light emitted from the object image 10 onto the recording surface 20, the present inventor has conceived a method for using three-dimensional cells. The following procedure should be carried out to record a complex amplitude distribution by use of three-dimensional cells and record the object image 10 as a hologram. First, a three-dimensional virtual cell set 30 is defined at the position of the recording surface 20 as shown in FIG. 5, for example. The three-dimensional virtual cell set 30 is constructed by vertically and horizontally arranging block-like virtual cells each of which has a predetermined size so as to place the cells two-dimensionally. Thereafter, the representative point of each virtual cell is defined. The position of the representative point may be one arbitrary point in the cell. In this case, the representative point of the cell is defined at the position of the center point on the front surface of the cell (i.e., surface facing the object image 10). For example, if an XY coordinate system is defined on the front surface of the three-dimensional virtual cell set 30 (i.e., on the surface facing the object image 10), and a virtual cell having the representative point P(x, y) located at the position of coordinates (x, y) in this coordinate system is called a virtual cell C(x, y), the representative point P(x, y) will occupy the center point of the front surface of this virtual cell C(x, y).

On the other hand, the object image 10 is defined as a set of point light sources. In the example of FIG. 5, the object image 10 is defined as a set of K point light sources O(1), O(2), ..., O(k), ..., O(K). Object light having predetermined amplitude and phase is emitted from each point light source, and a composite wave of these object light rays reaches the representative point P(x, y). The complex amplitude of this composite wave can be calculated according to the above-mentioned expressions and can be shown as a coordinate point Q on the complex coordinate plane shown in FIG. 4, and, based on this coordinate point Q, the amplitude A(x, y) and phase θ(x, y) are obtained, as described above. Herein, the amplitude A(x, y) and phase θ(x, y) obtained for the representative point P(x, y) will be called a specific amplitude A(x, y) and a specific phase θ0 (x, y) for the virtual cell C(x, y) including the representative point P(x, y).

The above-mentioned procedure is practically carried out as arithmetic processing by use of a computer. Accordingly, concerning each of all the virtual cells that make up the three-dimensional virtual cell set 30, a specific amplitude and a specific phase can be obtained by this arithmetic processing. Therefore, an optical element (i.e., a hologram recording medium in which the object image 10 is recorded) that is made up of a set of three-dimensional physical cells can be formed by replacing these virtual cells with real physical cells, respectively. Herein, the physical cell to be replaced with the virtual cell must have optical properties by which the amplitude and phase of incidence light can be modulated in accordance with the specific amplitude and specific phase defined in the virtual cell. In other words, when predetermined incidence light is given, the replaced individual physical cell must have the specific optical properties of having a function to generate emission light by changing the amplitude and phase of the incidence light in accordance with the specific amplitude and specific phase that have been defined in the virtual cell before replacement.

When predetermined reconstructing illumination light (ideally, a plane wave of monochromatic light with the same wavelength as the wavelength λ of the object light used in the above-mentioned arithmetic processing) is projected onto the optical element made up of a set of physical cells having the specific optical properties, the reconstructing illumination light is modulated by the specific amplitude and the specific phase in each physical cell. Therefore, the original wave front of the object light is reconstructed. As a result, the hologram recorded in this optical element is reconstructed.

§ 2. Concrete Structure of Physical Cell

Figure 6:
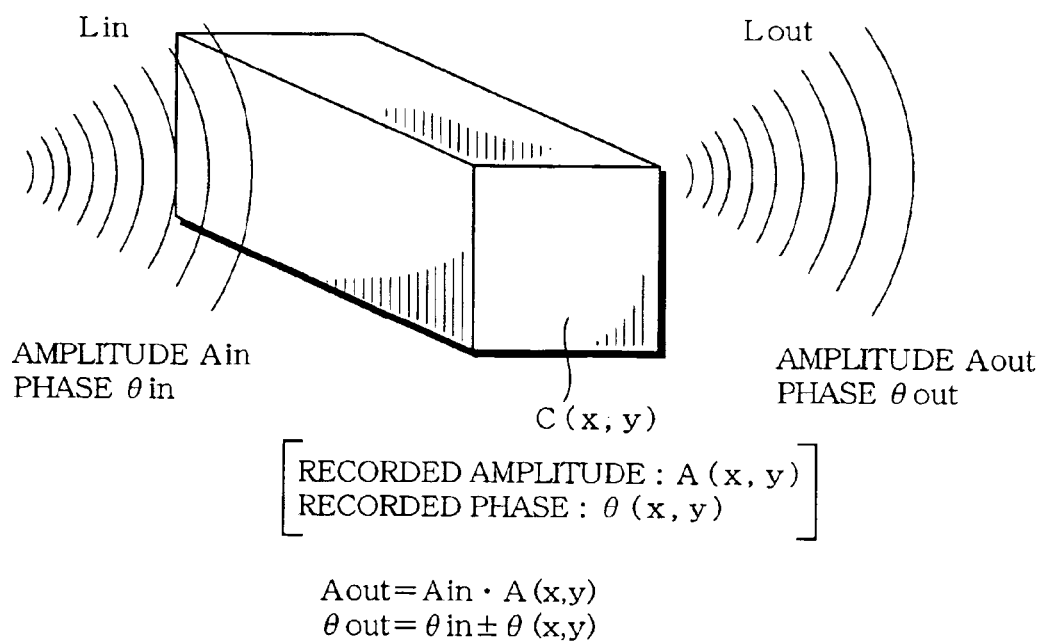
FIG. 6 shows the function of the amplitude modulation and phase modulation of a three-dimensional cell C(x, y) used in the present invention.

Next, the concrete structure of a physical cell used in the present invention will be described. A physical cell used in the present invention is a three-dimensional stereo-cell, and its specific amplitude and its specific phase are defined. Any type of cell can be used if it has such a specific optical property that emission light in which the amplitude and phase of predetermined incidence light are changed in accordance with the specific amplitude and specific phase defined in the cell can be obtained when the incidence light is given to the cell. For example, in a case in which an amplitude A(x, y) and a phase θ(x, y) is recorded for a three-dimensional cell C(x, y) shown in FIG. 6, and incidence light Lin whose amplitude is Ain and whose phase is θ in is given to this cell, all that is needed is to obtain emission light Lout whose amplitude Aout equals Ain·A(x, y) and whose phase θ out equals θ in ±θ(x, y). The amplitude Ain of the incidence light undergoes modulation by the specific amplitude A(x, y) recorded on the cell and changes into the amplitude Aout, whereas the phase θ in of the incidence light undergoes modulation by the specific phase θ(x, y) recorded on the cell and changes into the phase θ out.

One method for modulating the amplitude in the three-dimensional cell is to provide an amplitude-modulating part having transmittance that corresponds to the specific amplitude in the cell (the entire cell may be used as the amplitude-modulating part, or the amplitude-modulating part may be provided to a part of the cell). For example, a cell provided with the amplitude-modulating part whose transmittance is Z% serves as a cell in which the specific amplitude of A(x, y) equal to Z/100 is recorded, and, when incidence light with the amplitude Ain passes through this cell, it is subjected to amplitude modulation by emission light whose amplitude Aout equals Ain·Z/100. One possible method for setting the transmittance of each three-dimensional cell at an arbitrary value is to, for example, change the content of a coloring agent for each cell.

Another method for modulating the amplitude in the three-dimensional cell is to provide an amplitude-modulating part having reflectivity that corresponds to the specific amplitude in the cell. For example, a cell provided with the amplitude-modulating part whose reflectivity is Z% serves as a cell in which the specific amplitude of A(x, y) equal to Z/100 is recorded, and, when incidence light with the amplitude Ain is reflected by this amplitude-modulating part and is emitted, it is subjected to amplitude modulation by emission light whose amplitude Aout equals Ain·Z/100. One possible method for setting the reflectivity of each three-dimensional cell at an arbitrary value is to, for example, prepare a reflecting surface in the cell (this reflecting surface serves as the amplitude-modulating part) and set the reflectivity of the reflecting surface at an arbitrary value. More specifically, the ratio of reflected light to scattered light can be adjusted by, for example, changing the surface roughness of the reflecting surface, and therefore the adjustment of the surface roughness makes it possible to prepare a cell having arbitrary reflectivity.

Still another method for modulating the amplitude in the three-dimensional cell is to provide an amplitude-modulating part having an effective area that corresponds to the specific amplitude in the cell. For example, if it is assumed that the area of all the incident region of incidence light is 100%, a cell having an amplitude-modulating part constructed such that emission light effective for reconstructing an object image can be obtained only from incidence light that has struck a part having a Z% effective area thereof serves as a cell in which the specific amplitude of A(x, y)=Z/100 is recorded. That is, even if incidence light having the amplitude Ain strikes the amplitude-modulating part, only Z% of the light goes out as effective emission light, and therefore it is subjected to amplitude modulation by emission light having the amplitude of Aout=Ain·Z/100. One possible method for obtaining effective emission light only from a region having such a specific effective area is to use a cell having a physical concave/convex structure. A concrete example thereof will be described in § 3.

On the other hand, one method for modulating the phase in the three-dimensional cell is to provide a phase-modulating part having a refractive index that corresponds to the specific phase in the cell (the entire cell can be used as the phase-modulating part, or the phase-modulating part can be provided to a part of the cell). For example, even if incidence light with the same phase is given, a difference in the phase of emission light arises between a cell provided with the phase-modulating part made of a material whose refractive index is n1 and a cell provided with the phase-modulating part made of a material whose refractive index is n2. Therefore, arbitrary phase modulation can be applied to the incidence light by constructing the cell made of various materials with different refractive indexes.

Another method for modulating the phase in the three-dimensional cell is to provide a phase-modulating part having an optical path length that corresponds to the specific phase in the cell (the entire cell can be used as the phase-modulating part, or the phase-modulating part can be provided to a part of the cell). For example, even if the cell has a phase-modulating part made of the same material whose refractive index is n, a difference in the phase of each emission light will arise if the optical path length of the phase-modulating part is different regardless of the fact that incidence light with the same phase is given. For example, if the optical path length of the phase-modulating part provided in a first cell is L, and the optical path length of the phase-modulating part provided in a second cell is 2L, the distance by which emission light emitted from the second cell travels through the material whose refractive index is n is twice as long as in the case of emission light emitted from the first cell even if incidence light with the same phase is given. Therefore, such a great phase difference arises. A method for realizing a phase-modulating part with an arbitrary optical path length is to use a cell having a physical concave/convex structure. A concrete example thereof will be described in § 3.

A three-dimensional cell having an amplitude modulating function based on a specific amplitude or a three-dimensional cell having a phase modulating function based on a specific phase can be realized by some of the methods described above, and an optical element according to the present invention can be realized by selecting an arbitrary method from among the amplitude modulating methods and the phase modulating methods mentioned above. For example, if a method in which an amplitude-modulating part with transmittance that corresponds to a specific amplitude is provided in the cell is employed as the amplitude modulating method, and a method in which a phase-modulating part with a refractive index that corresponds to a specific phase is provided in the cell is employed as the phase modulating method, and the entire cell is used as the amplitude-modulating part and as the phase-modulating part, an optical element can be formed by selectively arranging 16 kinds of physical cells shown in the table of FIG. 7. The horizontal axis of this table indicates amplitude A, and the vertical axis thereof indicates phase θ. The amplitude A and the phase θ are each divided into four ranges.

Herein, the cells (i.e., cells of the first column in the table) depicted in a range in which the amplitude A corresponds to "0–25%" are ones that are each made of a material whose transmittance is very low, the cells (i.e., cells of the second column in the table) depicted in a range in which the amplitude A corresponds to "25–50%" are ones that are each made of a material whose transmittance is slightly low, the cells (i.e., cells of the third column in the table) depicted in a range in which the amplitude A corresponds to "50–75%" are ones that are each made of a material whose transmittance is slightly high, and the cells (i.e., cells of the fourth column in the table) depicted in a range in which the amplitude A corresponds to "75–100%" are ones that are each made of a material whose transmittance is very high. On the other hand, the cells (i.e., cells of the first row in the table) depicted in a range in which the phase θ corresponds to "0–π/2" are ones that are each made of a material whose refractive index n1 is very close to that of air, the cells (i.e., cells of the second row in the table) depicted in a range in which the phase θ corresponds to "π/2–π" are ones that are each made of a material whose refractive index n2 is slightly greater than that of air, the cells (i.e., cells of the third row in the table) depicted in a range in which the phase θ corresponds to "π–3π/2" are ones that are each made of a material whose refractive index n3 is much greater than that of air, and the cells (i.e., cells of the fourth row in the table) depicted in a range in which the phase θ corresponds to "3π/2–2π" are ones that are each made of a material whose refractive index n4 is very much greater than that of air.

Figure 7:
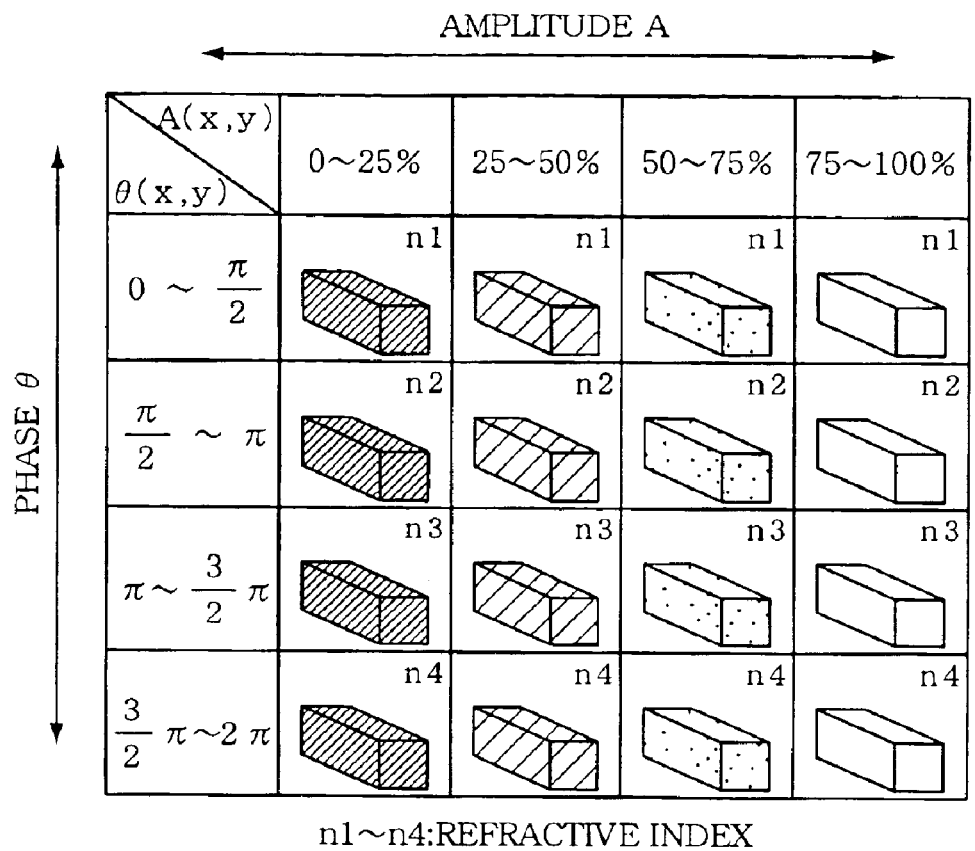
FIG. 7 shows one example of 16 kinds of physical cells different in transmittance and in refractive index that are to be the constituent parts of an optical element according to the present invention.

In the example of FIG. 7, sixteen cells in total with four kinds of transmittances and four kinds of refractive indexes are prepared as described above. A desirable way of recording the amplitude and phase in the cell with higher accuracy is to set the transmittance steps and the refractive-index steps in more detail and prepare even more kinds of cells. What is needed to replace the virtual cells by use of these sixteen kinds of physical cells is to select a physical cell that has optical properties closest in the optical properties needed to carry out modulation based on the specific amplitude and the specific phase defined in each virtual cell.

§ 3. Practical Structure of Physical Cell

If physical cells used in the present invention are cells that have a function to modulate incidence light in accordance with a specific amplitude and a specific phase as described above, any kind of cell structure is allowed to embody the present invention. FIG. 7 shows an example in which the modulation according to a specific amplitude is controlled by the transmittance, and the modulation according to a specific phase is controlled by the refractive index. Theoretically, many methods exist to modulate the amplitude or the phase as described above. However, from the viewpoint of industrial mass production, all the methods are not necessarily practical. In order to reconstruct an object image that has a certain degree of resolution by using the optical element according to the present invention, the size of each three-dimensional cell must be determined to be less than a criterion (roughly speaking, when the size of a cell exceeds 100 μm, it is difficult to reconstruct a satisfactorily discernible object image). Therefore, it is need to two-dimensionally arrange small cells as a component if sixteen kinds of physical cells shown in FIG. 7 are combined to form an optical element, and, additionally, there is a need to dispose a specific cell of the sixteen kinds of cells at a specific position. From this fact, it can be found that the method for constructing the optical element using the physical cells shown in FIG. 7 is unsuitable for industrial mass production.

As a method in which amplitude information and phase information can be given to a single physical cell and an optical element suitable for industrial mass production is constructed with a set of such physical cells, the present inventor has contrived a method for giving a concave/convex structure to each physical cell, then recording amplitude information as the area of this concave/convex structure part, and recording phase information as a level difference (i.e., depth of a concave part or height of a convex part) in the concave/convex structure part.

Figure 8:
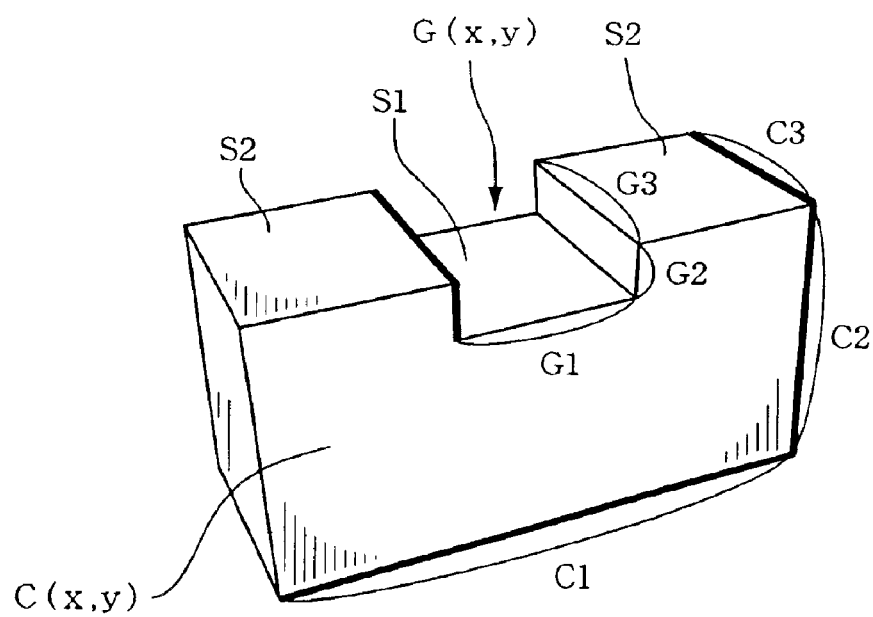
FIG. 8 is a perspective view showing one example of the structure of a physical cell C(x, y) considered most suitable for use in the present invention.

FIG. 8 is a perspective view showing an example of the structure of a physical cell C(x, y) that can be regarded as most suitable for use in the present invention. As shown in the figure, this three-dimensional physical cell has an almost rectangular solid block shape, and a groove G(x, y) is formed in the upper surface thereof. In this example, the size of the physical cell C(x, y), C1=0.6 μm, C2=0.25 μm, and C3=0.25 μm, and the size of the groove G(x, y), G1=0.2 μm, G2=0.05 μm, and G3=C3=0.25 μm are shown in the figure. The use of the thus constructed physical cell C(x, y) makes it possible to record the amplitude information as a value of the lateral width G1 of the groove G(x, y) and record the phase information as a value of the depth G2 of the groove G(x, y). In other words, when a virtual cell in which a specific amplitude and a specific phase are defined is replaced with the thus constructed physical cell, the replacement is carried out by the physical cell having the size G1 corresponding to the specific amplitude and having the size G2 corresponding to the specific phase.

Figure 9:
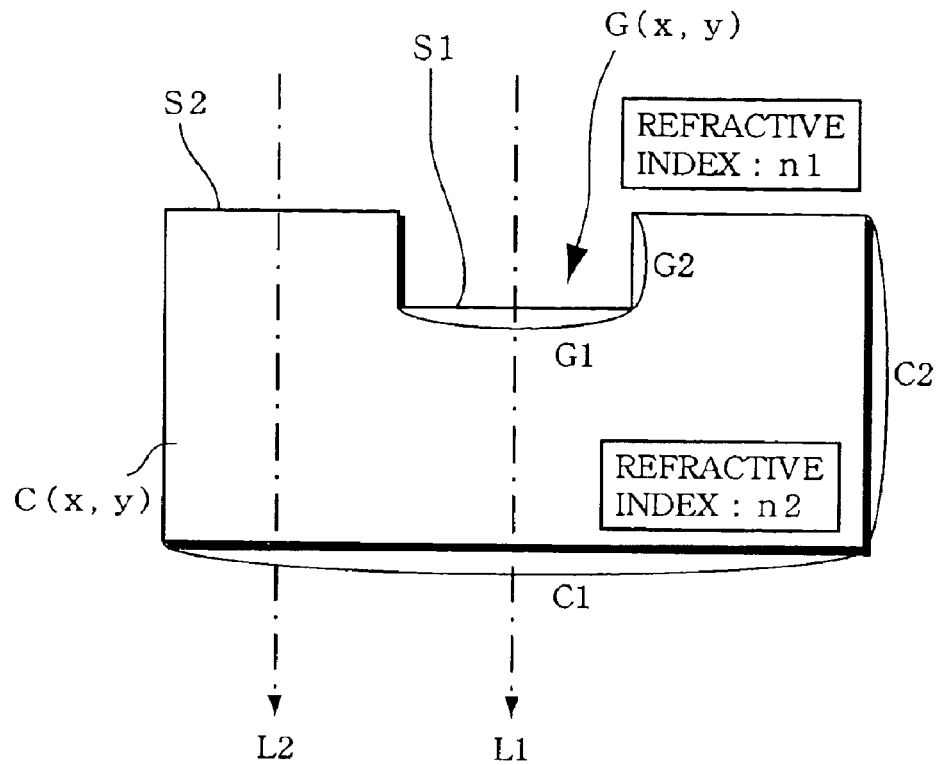
FIG. 9 is a front view for explaining a reason why amplitude information is recorded as a width G1 of a groove G(x, y) and phase information is recorded as a depth G2 of the groove G(x, y) when the physical cell C(x, y) shown in FIG. 8 is used as a transmission type cell.

With reference to the front view of FIG. 9, a description will be provided of the reason why the amplitude information is recorded as the width G1 of the groove G(x, y) and the phase information is recorded as the depth G2 of the groove G(x, y) in the physical cell shown in FIG. 8. Let us now suppose that the physical cell C(x, y) is made of a material with the refractive index n2, and the part outside the physical cell C(x, y) is made of a material (e.g., air) with the refractive index n1. In this case, when the optical path length passing through the medium with the refractive index n2 is compared between incident light L1 that has struck vertically the inner surface S1 of the groove G(x, y) and incident light L2 that has struck vertically the outer surface S2 of the groove G(x, y), it can be found that the optical path length of the light L1 is shorter than that of the light L2 by the depth G2 of the groove G(x, y). Therefore, if the refractive indexes n1 and n2 are different from each other, a predetermined phase difference will arise between the light L1 and the light L2 emitted from the physical cell C(x, y) as transmission light.

Figure 10:
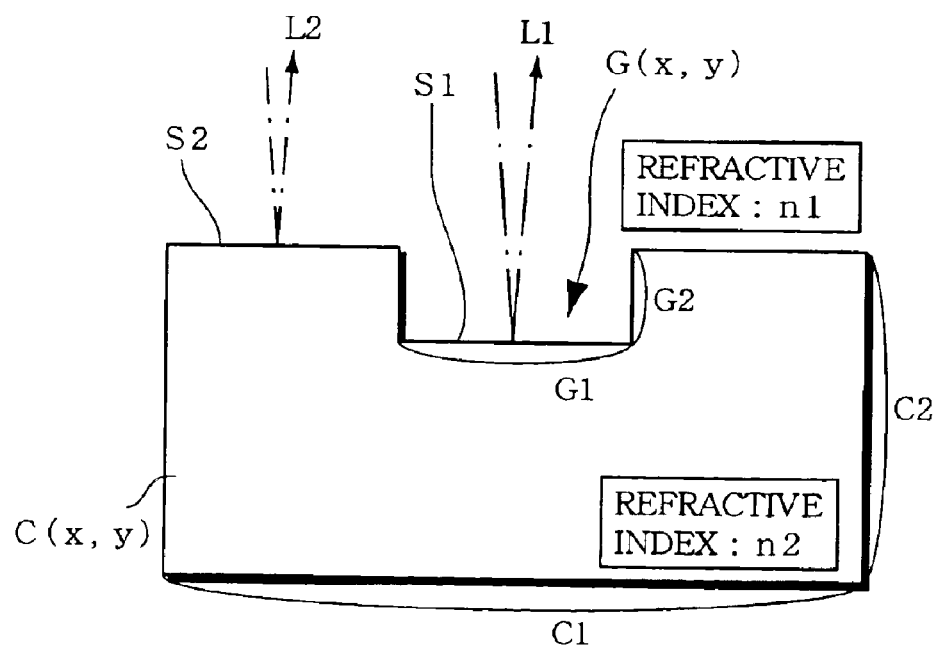
FIG. 10 is a front view for explaining a reason why amplitude information is recorded as the width G1 of the groove G(x, y) and phase information is recorded as the depth G2 of the groove G(x, y) when the physical cell C(x, y) shown in FIG. 8 is used as a reflection type cell.

On the other hand, FIG. 10 is a front view showing a case in which emission light is obtained as reflected light from the physical cell C(x, y). In this example, the upper surface of the physical cell C(x, y), i.e., surfaces S1 and S2 are reflecting-surfaces, and the incident light L1 that has struck almost vertically the inner surface S1 of the groove G(x, y) and the incident light L2 that has struck almost vertically the outer surface S2 of the groove G(x, y) are reflected by the respective surfaces almost vertically and emitted therefrom. At this time, it can be found that, when the entire optical path length along the path of the incidence and reflection is compared, the optical path length of the light L1 becomes longer than that of the light L2 by double the depth G2 of the groove G(x, y). Therefore, a predetermined phase difference arises between the light L1 and the light L2 emitted from the physical cell C(x, y) as reflected light.

Accordingly, even if the physical cell C(x, y) is a transmission type cell or a reflection type cell, a predetermined phase difference arises between the incident light L1 that has struck the inner surface S1 of the groove G(x, y) and the incident light L2 that has struck the outer surface S2 of the groove G(x, y). This phase difference depends on the depth G2 of the groove G(x, y). Therefore, if only the emission light obtained on the basis of the incidence light that has struck the inner surface S1 of the groove G(x, y) among the incident light rays that have struck the upper surface of the physical cell C(x, y) is treated as emission light effective for the reconstruction of the object image 10 (in other words, if only the light L1 is treated as emission light effective for the reconstruction of the image in FIG. 9 or FIG. 10), emission light L1 effective for the image reconstruction resultantly undergoes phase modulation by a specific phase that corresponds to the depth G2 of the groove G(x, y) in this physical cell C(x, y). Thus, the phase information of the object light can be recorded as the depth G2 of the groove G(x, y).

Further, if only the emission light obtained on the basis of the incidence light that has struck the inner surface S1 of the groove G(x, y) is treated as emission light effective for the reconstruction of the object image 10 as mentioned above, the amplitude information of the object light can be recorded as the width G1 of the groove G(x, y). The reason is that the area of the inner surface S1 of the groove G(x, y) enlarges, and the percentage of the emission light effective for the reconstruction of the object image 10 increases as the width G1 of the groove G(x, y) becomes greater. That is, since the emission light L2 shown in FIG. 9 or FIG. 10 does not include any significant phase components, the emission light is merely observed as a noise component of a so-called background, and is not recognized as light effective for reconstructing a significant image even if the emission light L2 is observed at a viewing position when reconstructed. By contrast, since the emission light L1 includes significant phase components, it is observed as a signal component effective for image reconstruction. After all, the width G1 of the groove G(x, y) becomes a factor for determining the ratio of the light L1 observed as a signal component among the light rays emitted from the physical cell C(x, y), and becomes a parameter for giving the amplitude information of the signal wave.

Generally, the amplitude information is not expressed by the width G1 of the groove G(x, y), but by the area of the inner surface S1 of the groove G(x, y). In the embodiment shown in FIG. 8, since the length G3 of the groove G(x, y) happens to be set to be always equal to the length C3 of the physical cell C(x, y), the area of the inner surface S1 of the groove G(x, y) is proportional to the extent of the width G1. However, the length G3 of the groove G(x, y) does not necessarily need to be fixed, and both of the width and the length may be changed so that the area of the inner surface S1 of the groove G(x, y) has variations.

If a part having an area corresponding to the specific amplitude (i.e., a part corresponding to the surface S1 of FIG. 8) of the upper surface of the block-like physical cell is hollowed by the depth corresponding to the specific phase (i.e., depth corresponding to the dimension G2 of FIG. 8) so as to form a concave part (i.e., groove G(x, y)) in this way, the amplitude modulation corresponding to the specific amplitude and the phase modulation corresponding to the specific phase can be applied to reconstructing illumination light by the thus constructed physical cell. Even if a convex part, instead of the concave part, is formed on the block-like physical cell, similar modulation processing can be applied. That is, even if the dimension G2 is set at a negative value, and a projection instead of the groove is formed on the physical block shown in FIG. 8, it is possible to produce an optical path difference corresponding to the height of the projection and produce a phase difference. In other words, if a part having an area corresponding to the specific amplitude of the upper surface of the block-like physical cell is protruded by the height corresponding to the specific phase so as to form a convex part, the amplitude modulation corresponding to the specific amplitude and the phase modulation corresponding to the specific phase can also be applied to reconstructing illumination light by the thus constructed physical cell.

Figure 11:
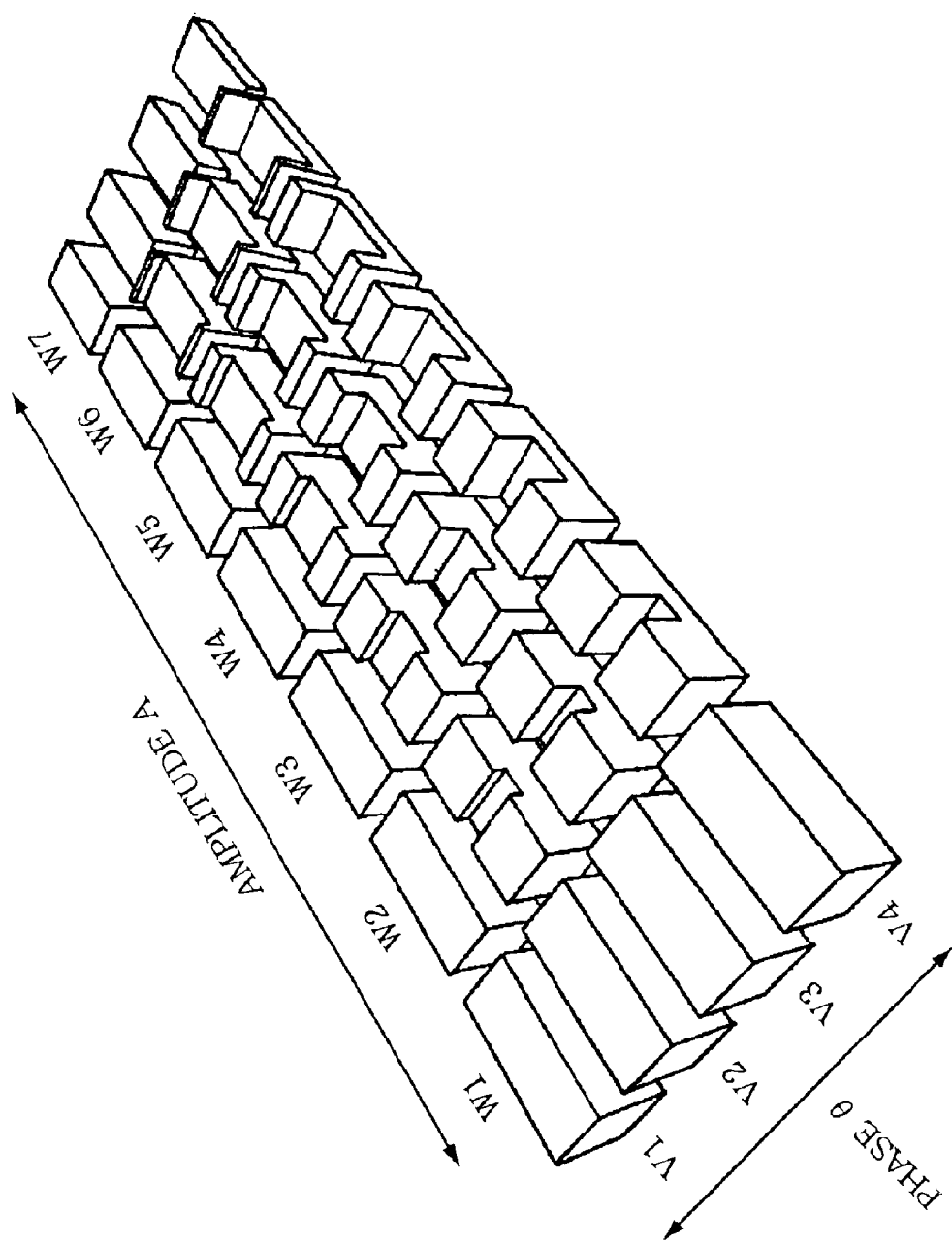
FIG. 11 is a perspective view showing an example in which seven kinds of groove widths and four kinds of depths are determined so that 28 kinds of physical cells in total are prepared in the structure of the physical cell C(x, y) shown in FIG. 8.

The width G1 and depth G2 of the groove can be consecutively changed in the physical cell C(x, y) having the groove G(x, y) shown in FIG. 8, and therefore, theoretically, infinite kinds of physical cells can be prepared. The use of the infinite kinds of physical cells makes it possible to replace the virtual cell with the physical cell having the accurate groove width G1 corresponding to the specific amplitude and the accurate depth G2 corresponding to the specific phase that are defined in the virtual cell. However, practically, it is preferable to predetermine α kinds of groove widths and β kinds of depths so as to prepare α×β kinds of physical cells in total and then select a physical cell closest in necessary optical properties from among the physical cells. FIG. 11 is a perspective view showing an example in which seven kinds of groove widths and four kinds of depths are determined so as to prepare 28 kinds of physical cells in total. Each of the 28 kinds of physical cells is a block-like physical cell formed as shown in FIG. 8, and, in FIG. 11, the physical cells are arranged in the form of a matrix of four rows and 7 columns.

In FIG. 11, the seven columns of the matrix indicate the variation of amplitude A, and the four rows thereof indicate the variation of phase θ. For example, the cell located at column W1 is a cell corresponding to the minimum value of amplitude A, wherein groove width G1=0, i.e., a groove G is not formed at all. Rightward, i.e., toward columns W2 to W7, the cells correspond to greater amplitude A, and the groove width G1 thereof gradually becomes greater. The cell located at column W7 is a cell corresponding to the maximum value of amplitude A, wherein groove width G1=cell width C1, i.e., the entire surface thereof is hollowed. Further, when attention is paid to the rows of the matrix of FIG. 11, the cell located at row V1, for example, is a cell corresponding to the minimum value of phase θ, wherein groove depth G2=0, i.e., a groove G is not formed at all. Downward, i.e., toward rows V2 to V4, the cells correspond to greater phase θ, and the groove depth G2 thereof gradually becomes greater.

§ 4. Optical Element Manufacturing Method by Use of Practical Physical Cells

Now, a description will be provided of a concrete method for manufacturing an optical element (hologram-recording medium) where an object image 10 is recorded by use of 28 kinds of physical cells shown in FIG. 11. First, as shown in FIG. 5, the object image 10 formed by a set of point light sources and a three-dimensional virtual cell set 30 are defined by use of a computer. Herein, respective virtual cells that make up the three-dimensional virtual cell set 30 are block-like cells (at this moment, a groove has not yet been formed) as shown in FIG. 8, and the three-dimensional virtual cell set 30 is formed by arranging the cells two-dimensionally and with equal pitches vertically and horizontally. The dimension of one virtual cell should be, for example, C1=0.6 μm, C2=0.25 μm, and C3=0.25 μm or so. In this case, if the lateral pitch of the cell is 0.6 μm, and the longitudinal pitch is 0.25 μm, the cells can be disposed without any gap. Of course, the dimensional value of each cell shown here is one example, and, in practice, it is possible to set it at an arbitrary dimension if necessary. However, as the cell dimension becomes greater, the visual angle by which a reconstructed image of an object is obtained is narrowed, and the resolution of the object is lowered proportionately. Reversely, as the cell dimension becomes smaller, the processing of forming a concave/convex structure of the physical cell technically becomes difficult. In consideration of the arithmetic processing or the convenience of the processing of the physical cells, it is preferable to dispose the cells with predetermined equal pitches vertically and horizontally though they do not necessarily need to be disposed with equal pitches.

After the definition of the object image 10 and the definition of the three-dimensional virtual cell set 30 are completed, a representative point is defined in each virtual cell, and then the complex amplitude of the composite wave of each object light that has reached each representative point is calculated as described in § 2, and a specific amplitude and a specific phase are defined for each virtual cell. Thereafter, each virtual cell is replaced with any one of the 28 kinds of physical cells shown in FIG. 11 (in other words, it is replaced with a physical cell closest in optical properties needed for modulation according to the specific amplitude and the specific phase defined in each individual virtual cell), and an optical element is formed as a set of physical cells. At this time, the groove-forming surface of each physical cell (in the case of the physical cell shown in FIG. 8 or FIG. 11, the upper surface) is designed to face the front surface (i.e., the surface facing the object image 10) of the three-dimensional virtual cell set 30 shown in FIG. 5.

In fact, the replacement of the virtual cell with the physical cell is carried out as the processing of forming a given concave/convex structure on the surface of a medium to become an optical element. Since the physical cell is disposed so that its groove is directed forward when each virtual cell of the three-dimensional virtual cell set 30 shown in FIG. 5 is replaced with the physical cell as mentioned above, a finally formed optical element appears as a medium whose surface has a concave/convex structure formed with many grooves. Therefore, the replacement of the virtual cell with the physical cell is carried out as processing of providing data relative to a concave/convex pattern to a drawing device from a computer that stores information for each virtual cell (i.e., information that shows the specific amplitude and the specific phase defined in each virtual cell) and then drawing the concave/convex pattern onto the physical surface of the medium by the drawing device. The processing of drawing a fine concave/convex pattern can be carried out by, for example, a patterning technique that uses an electron-beam drawing device. What is needed to mass-produce the same optical element is to form an original plate in which a desired concave/convex structure is formed by the drawing processing that uses an electron-beam drawing device, for example, and to transfer the concave/convex structure onto many mediums by the stamping step that uses the original plate.

The optical element according to the present invention is basically formed with a main body layer that is obtained by two-dimensionally arranging the physical cells shown in FIG. 8. However, a protective layer may be placed on the surface of the main body layer if necessary. This protective layer serves to cover the concave/convex surface formed in the surface of the main body layer. The main body layer and the protective layer are made of materials different from each other.

In a transmission type optical element in which incidence light given to each physical cell passes through the main body layer and the protective layer and then turns into emission light, the main body layer and the protective layer must be made of a transparent material and another transparent material, respectively, that are different in the refractive index. Here, let us consider a concrete relationship between the depth of the groove G and the phase when a transmission type optical element (i.e., transmission type physical cell) of a two-layer structure made of such a main body layer and a protective layer is manufactured.

Figure 12:
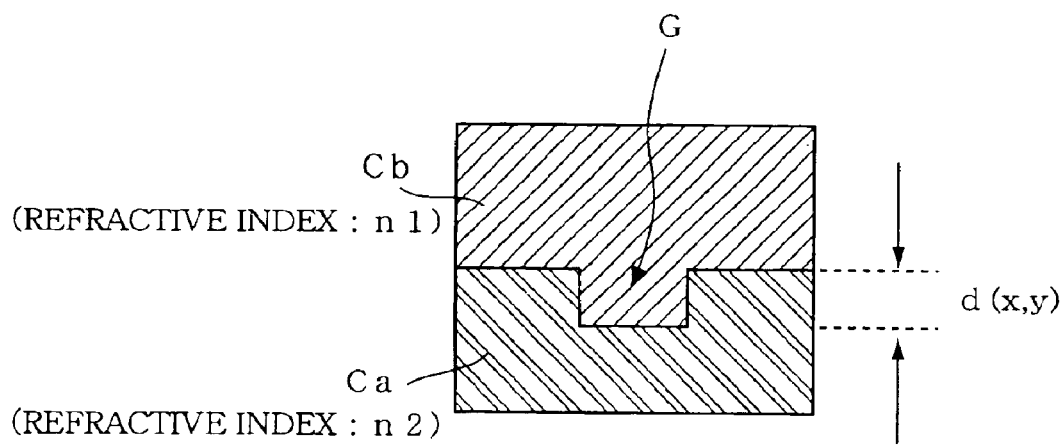
FIG. 12 shows the relationship between the refractive index and the groove depth of each part for the transmission type cell C(x, y).

Now, let us consider a transmission type cell C(x, y) having a structure shown in the sectional view of the upside of FIG. 12. This is a cell having a two-layer structure made of a main body layer Ca in which a groove G whose depth is d(x, y) is formed and a protective layer Cb placed on the upper surface thereof in such a way as to fill the groove G. Herein, the refractive index of a material that forms the protective layer Cb (in other words, the refractive index of a material with which the concave part is filled or a material that constitutes the convex part) is represented as n1, and the refractive index of a material that forms the main body layer Ca is represented as n2. If the maximum depth dmax of the groove G (in other words, the maximum depth of the concave part or the maximum height of the convex part) is set to be dmax=$\lambda/|n1-n2|$, a physical cell can be realized in which phase modulation within the range of 0 through $2\pi$ can be applied to light whose wavelength is $\lambda$. For example, if the wavelength $\lambda$ equals 400 nm ($\lambda$=400 nm) and the difference $|n1-n2|$ in the refractive index equals 2, the maximum depth can be set to be dmax=200 nm (0.2 $\mu$m).

In this case, as shown in FIG. 12, the depth d(x, y) corresponding to the specific phase $\theta$(x, y) can be obtained by the following equations:

If $n1 > n2$, $d(x, y) = \lambda \cdot \theta(x, y)/2(n1-n2)\pi$ and, if $n1 < n2$, $d(x, y) = dmax - \theta(x, y)/2(n2-n1)\pi$ Accordingly, after the specific amplitude and specific phase of a certain virtual cell C(x, y) are obtained as A(x, y) and $\theta$(x, y), respectively, the specific phase $\theta$(x, y) is substituted for the above equation so as to calculate a corresponding depth d(x, y), and then a physical cell that has a depth closest to the resulting depth d(x, y) and has a width closest to the dimension corresponding to the specific amplitude A(x, y) is selected from among the 28 kinds of physical cells shown in FIG. 11, and the replacement of the virtual cell C(x, y) with the selected physical cell is carried out. If the protective layer Cb is not provided, the refractive index of air (almost 1) can be used as the refractive index n1 of the protective layer.

On the other hand, let us consider a reflection type cell C(x, y) having a structure shown in the sectional view of the upside of FIG. 13. This is a cell having a two-layer structure made of a main body layer C$\alpha$ in which a groove G whose depth is d(x, y) is formed and a protective layer C$\beta$ placed on the upper surface thereof in such a way as to fill the groove G. In this cell, the boundary between the main body layer C$\alpha$ and the protective layer C$\beta$ serves as a reflecting surface. The reflectance on this reflecting surface is not necessarily to be 100%. The reflecting surface may be a half-mirror having a reflectance of e.g. 50%. The reflecting surface is also provided by inserting a half transparent layer such as a transflector between the main body layer C$\alpha$ and the protective layer C$\beta$. Incidence light that has struck the protective layer C$\beta$ from the upper side of the figure downward is reflected by the reflecting surface and is emitted upward in the figure. Herein, the refractive index of a material that forms the protective layer C$\beta$ (in other words, the refractive index of a material with which the concave part is filled or a material that constitutes the convex part) is represented as n. If the maximum depth dmax of the groove G (in other words, the maximum depth of the concave part or the maximum height of the convex part) is set to be dmax=$\lambda/2n$, a physical cell can be realized in which phase modulation within the range of 0 through $2\pi$ can be applied to light whose wavelength is $\lambda$. For example, if the wavelength $\lambda$ equals 400 nm ($\lambda$=400 nm) and the refractive index equals 2 (n=2), the maximum depth can be set to be dmax=100 nm (0.1 $\mu$m).

In this case, as shown in FIG. 13, the depth d(x, y) corresponding to the specific phase $\theta$(x, y) is obtained by the following equation:

$$d(x, y) = \lambda \cdot \theta(x, y)/4n\pi$$

If the protective layer Cβ is not provided, the refractive index of air (almost 1) can be used as the refractive index n of the protective layer. Accordingly, the maximum depth of the groove G can be set to be dmax=λ/2, and the depth d(x, y) corresponding to the specific phase θ(x, y) can be determined by the following equation:

$$d(x, y) = \lambda \cdot \theta(x, y)/4\pi$$

§ 5. Modification in Consideration of Convenience of Reconstructive Environment

Figure 14:
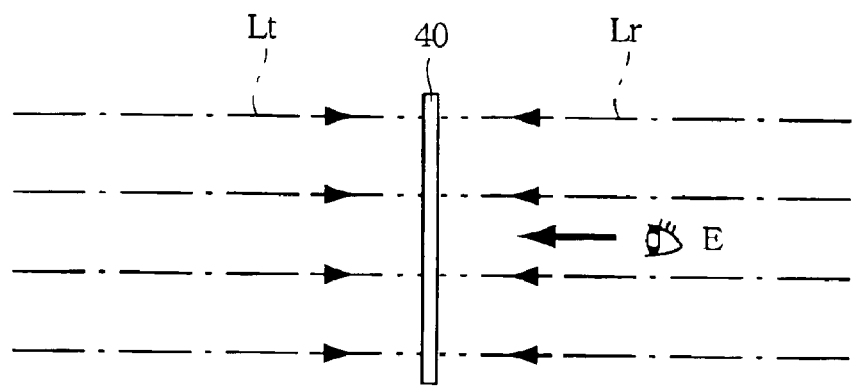
FIG. 14 is a side view showing a basic form in which reconstructing illumination light is projected from a normal direction onto the optical element of the present invention, and an object image recorded as a hologram is observed from the normal direction.

Let us now consider an environment in which reconstructing illumination light is projected onto the optical element manufactured according to the method described above so as to reconstruct the object image 10 recorded as a hologram. FIG. 14 is a side view showing the relationship among an optical element 40 (i.e., hologram-recording medium that uses physical cells), reconstructing illumination light Lt or Lr, and a viewing point E that are used for the reconstruction. If the optical element 40 is a transmission type element that uses transmission type cells, the reconstructing illumination light Lt is projected to the surface opposite to the viewing point E as shown in the figure, and light that has passed through the optical element 40 is observed at the viewing point E. If the optical element 40 is a reflection type element that uses reflection type cells, the reconstructing illumination light Lr is projected to the surface on the same side as the viewing point E as shown in the figure, and light that has been reflected from the optical element 40 is observed at the viewing point E. In any case, when the optical element 40 is manufactured according to the above method, the most excellent reconstructed image can be obtained in the condition that the reconstructing illumination light Lt or Lr is given as a plane wave of monochromatic light and projected in the normal direction to the recording surface (i.e., a two-dimensional array surface on which physical cells are arranged) of the optical element 40 as shown in FIG. 14 (in other words, reconstructing illumination light is projected so that the wave front becomes parallel with the recording surface of the optical element 40), and the image is observed in the normal direction to the recording surface.

Figure 15:
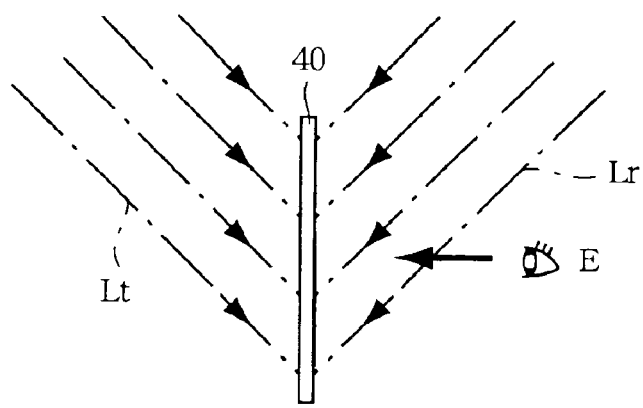
FIG. 15 is a side view showing a form in which reconstructing illumination light is projected from an oblique direction onto the optical element of the present invention, and an object image recorded as a hologram is observed from the normal direction.
Figure 16:
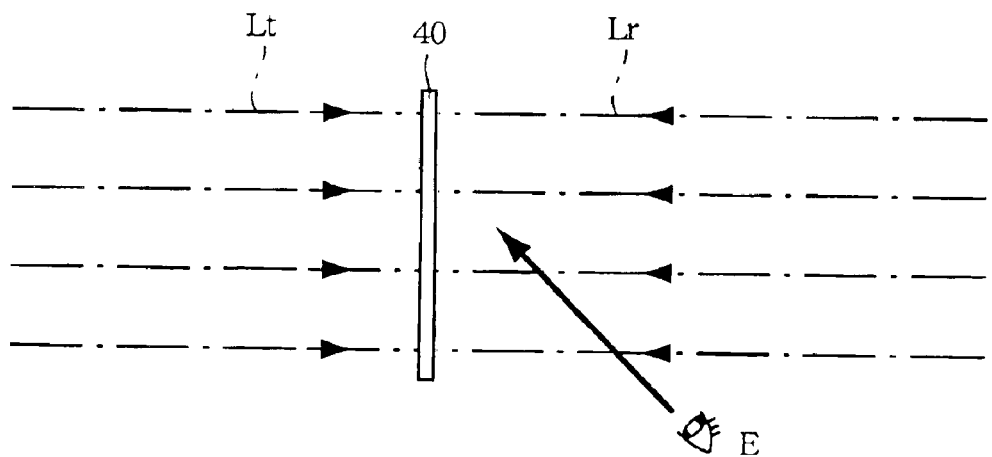
FIG. 16 is a side view showing a form in which reconstructing illumination light is projected from the normal direction onto the optical element of the present invention, and an object image recorded as a hologram is observed from the oblique direction.

However, the actual reconstructive environment of the optical element 40 where the object image 10 is recorded as a hologram does not necessarily lead to the ideal environment shown in FIG. 14. Especially, in the case of the reflection type, since a head of an observing person is located at the position of the viewing point E, a shadow of the person, which makes the excellent reconstruction impossible, appears on the optical element 40 even if the reconstructing illumination light Lr is projected from the direction shown in FIG. 14. Therefore, generally, the actual reconstructive environment has an aspect in which the reconstructing illumination light Lt or Lr is projected in the oblique direction with respect to the recording surface of the optical element 40 so as to observe the reconstructed image at the viewing point E located in the normal direction as shown in FIG. 15, or, alternatively, an aspect in which the reconstructing illumination light Lt or Lr is projected in the normal direction to the recording surface of the optical element 40 so as to observe the reconstructed image at the viewing point E located in the oblique direction as shown in FIG. 16, or, alternatively, an aspect in which both the projecting direction of the reconstructing illumination light Lt or Lr and the observing direction with respect to the viewing point E are set as the oblique direction.

What is needed to manufacture the optical element 40 by which an excellent reconstructed image can be obtained in the actual reconstructive environment is to carry out phase-correcting processing in which the specific phase defined for each virtual cell is corrected, in consideration of the direction of the illumination light projected when reconstructed and the position of the viewing point when reconstructed.

Figure 17:
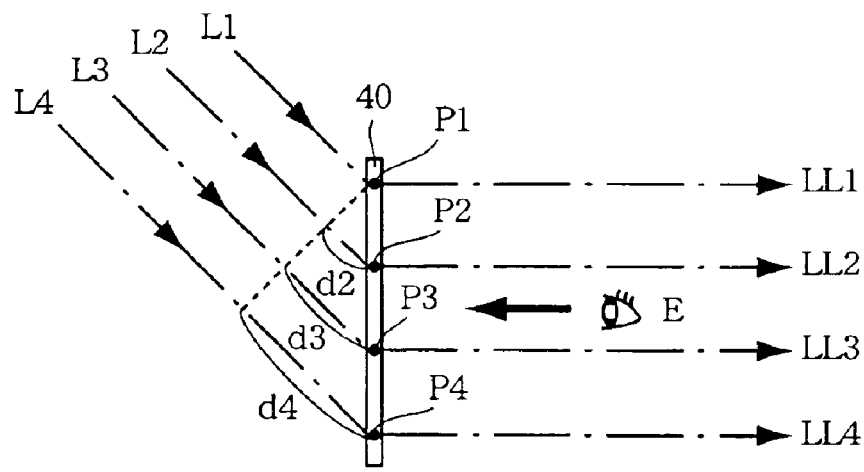
FIG. 17 is a side view showing a principle according to which specific phase is subjected to corrective processing in order to make an optical element that corresponds to a reconstructing environment shown in FIG. 15.

For example, let us consider a case in which, as shown in FIG. 17, reconstructing illumination light rays L1 through L4 are projected in the oblique direction, and light rays LL1 through LL4 that have undergone modulation of the amplitude and the phase as a result of passing through the optical element 40 (in other words, light rays LL1 through LL4 have the reconstructed wave front of the object light emitted from the object image 10) are observed at the viewing point E located in the normal direction. If the reconstructing illumination light rays L1 through L4 are each a monochrome plane wave whose wavelength is λ and if the reconstructing illumination light is projected onto the optical element 40 in the oblique direction, an optical path difference will have already arisen when the light reaches each point P1 through P4 on the optical element 40, and incidence light at each point P1 through P4 will have already generated a phase difference. For example, the incidence light rays upon the positions of points P2, P3, and P4 are longer in the optical path length by d2, d3, and d4, respectively, than the incidence light ray upon the position of point P1. Therefore, the incidence light has already generated a phase difference in proportion to the optical path difference. Therefore, if there is the supposition that "the optical element 40 is manufactured by which an excellent reconstructed image can be obtained in the reconstructive environment shown in FIG. 17", the specific phase about each virtual cell can be calculated according to the above-mentioned method, and thereafter the processing of correcting each specific phase can be carried out in accordance with the position of the cell. For example, there is no need to correct the cell located at the position of point P1 of FIG. 17, and the cell located at the position of point P2 undergoes the correction of the specific phase so as to cancel a phase difference caused by the optical path difference d2. Accordingly, if the optical element 40 is manufactured while carrying out the correction of the specific phase, an excellent reconstructed image can be given by the light rays LL1 through LL4 emitted toward the viewing point E.

Figure 18:
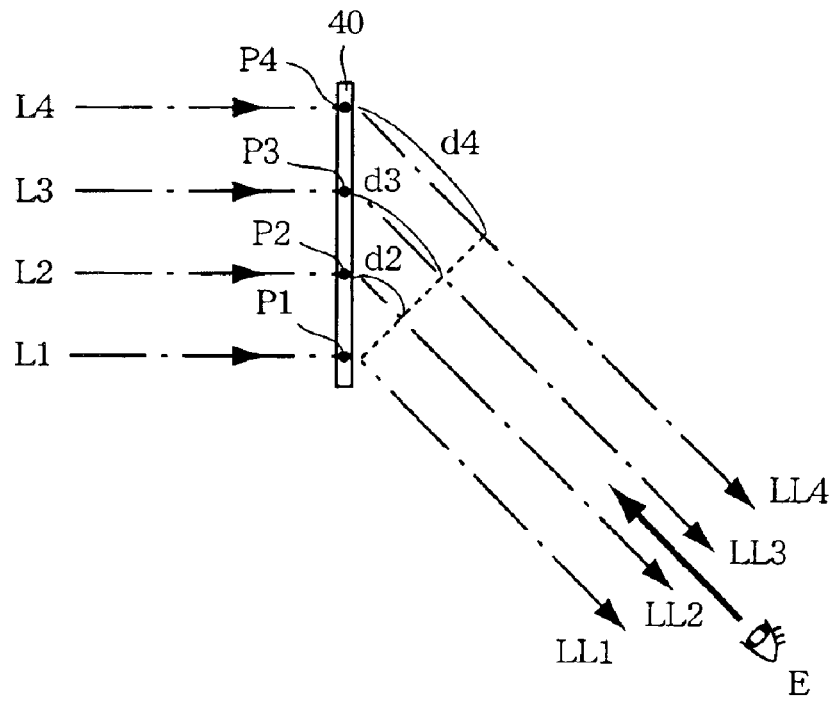
FIG. 18 is a side view showing a principle according to which specific phase is subjected to corrective processing in order to make an optical element that corresponds to a reconstructing environment shown in FIG. 16.

This corrective processing to the specific phase is likewise carried out in a case in which, as shown in FIG. 18, the reconstructing illumination light rays L1 through L4 are projected in the normal direction so as to observe the light rays LL1 through LL4 that have undergone modulation of the amplitude and the phase as a result of passing through the optical element 40 (i.e., light that has reconstructed the wave front of the object light from the object image 10) at the viewing point E located in the oblique direction. That is, if the reconstructing illumination light rays L1 through L4 are each a monochrome plane wave whose wavelength is λ and if the reconstructing illumination light rays are projected onto the optical element 40 in the normal direction, no optical path difference occurs when the light ray reaches each point P1 through P4 on the optical element 40, and the phases of the incidence light rays upon points P1 through P4 coincide with each other. However, a difference arises among the optical path lengths from points P1 through P4 to the viewing point E that the emission light emitted therefrom reaches, and a phase difference will arise when observed at the viewing point E. For example, the emission light rays from the positions of points P2, P3, and P4 are longer in the optical path length by d2, d3, and d4, respectively, than the emission light ray from the position of point P1. Therefore, the emission light has generated a phase difference in proportion to the optical path difference at the position of the viewing point E. Therefore, if there is the supposition that "the optical element 40 is manufactured by which an excellent reconstructed image can be obtained in the reconstructive environment shown in FIG. 18", the specific phase about each virtual cell can be calculated according to the above-mentioned method, and thereafter the processing of correcting each specific phase can be carried out in accordance with the position of the cell. For example, there is no need to correct the cell located at the position of point P1 of FIG. 18, and the cell located at the position of point P2 undergoes the correction of the specific phase so as to cancel a phase difference caused by the optical path difference d2. Accordingly, if the optical element 40 is manufactured while carrying out the correction of the specific phase, an excellent reconstructed image can be provided by the light rays LL1 through LL4 emitted toward the viewing point E.

The corrective processing to the specific phase for the transmission type optical element 40 was described above. The same principle of the corrective processing applies to the reflection type optical element 40.

On the other hand, concerning the wavelength of the reconstructing illumination light, a case where monochromatic light whose wavelength is λ can be used as reconstructing illumination light is extremely rare in the actual reconstructive environment, and therefore, normally, a case where the reconstruction is carried out under reconstructing illumination light close to white can be regarded as general. If the reconstruction is carried out by use of reconstructing illumination light that includes a plurality of wavelength components, different phase modulation is performed for light having each individual wavelength, and therefore an excellent reconstructed image cannot be obtained. Concretely, a reconstructed image is formed as if images with various colors are superimposed on each other with slight incongruity.

Figure 19:
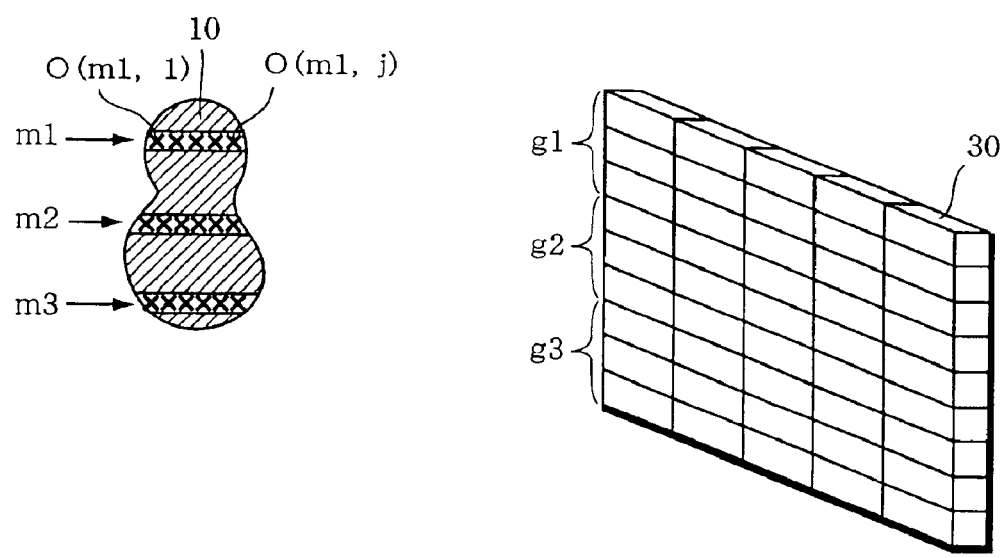
FIG. 19 is a perspective view showing a technique for making an optical element that corresponds to a reconstructing environment in which white reconstructing illumination light is used.

Therefore, in order to obtain a fairly excellent reconstructed image even in the reconstructive environment that uses white reconstructing illumination light, a method, such as that shown in FIG. 19, should be applied when a complex amplitude distribution of object light is calculated. Like the system shown in FIG. 5, a system shown in FIG. 19 is used to define the object image 10 and the three-dimensional virtual cell set 30 on a computer and calculate for obtaining a distribution of the totaled complex amplitude of each object light emitted from the object image 10 on the three-dimensional virtual cell set 30. Herein, the three-dimensional virtual cell set 30 is constructed by arranging virtual cells horizontally and vertically, and is a cell set that consists of the virtual cells arranged on the two-dimensional matrix. Representative points are defined in the virtual cells, respectively.

When the technique described herein is employed, the totaled complex amplitude at the position of each representative point is calculated by the following method. First, a plurality of M point-light-source rows each of which extends horizontally and which are mutually arranged vertically are defined on the object image 10. In the example of the figure, M=3, and three point light source rows m1, m2, and m3 are defined. Each point light source row includes a plurality of point light sources arranged horizontally. For example, a point light source row m1 includes j point light sources O(m1,1), O(m1,2), . . . , O(m1,j). On the other hand, on the side of the three-dimensional virtual cell set 30, M groups in total are defined by defining groups of virtual cells that belong to a plurality of rows contiguous vertically as one group in the two-dimensional matrix. In the example of the figure, three groups in total are defined as M=3. That is, a first group g1 consists of virtual cells that belong to first through third rows, a second group g2 consists of virtual cells that belong to fourth through sixth rows, and a third group g3 consists of virtual cells that belong to seventh through ninth rows.

The M point light source rows are thus defined on the side of the object image 10, and the M groups are defined on the side of the three-dimensional virtual cell set 30. Thereafter, the M point light source rows and the M groups are caused to correspond to each other in accordance with the arrangement order concerning the vertical direction. That is, in the example of the figure, the uppermost point light source row m1 is caused to correspond to the uppermost group g1, the middle point light source row m2 is caused to correspond to the middle group g2, and the lowermost point light source row m3 is caused to correspond to the lowermost group g3. Thereafter, on the supposition that the object light emitted from a point light source in the m-th point light source row (m=1 to M) reaches only the virtual cell that belongs to the m-th group, the totaled complex amplitude at the position of each representative point is calculated. For example, the object light emitted from the point light sources O(m1,1), O(m1,2), . . . , O(m1,j) that belong to the point light source row m1 in FIG. 19 is regarded as reaching only the virtual cells that belongs to the group g1 (virtual cells arranged in the first to third rows), and as not reaching the virtual cells that belongs to the groups g2 and g3, and the totaled complex amplitude is calculated. In other words, the calculation of the totaled complex amplitude at the position of the representative point of the virtual cell that belongs to the group g1 is carried out in consideration of only the object light emitted from the point light sources O(m1,1), O(m1,2), . . . , O(m1,j) that belong to the point light source row m1, not in consideration of the object light emitted from the point light sources that belong to the point light source rows m2 and m3.

Actually, the object image 10 cannot be recorded as an original hologram if it is recorded under these conditions. After all, the basic principle of the hologram resides in that all information for the object image 10 is recorded onto any places of the recording surface, and thereby a stereoscopic image can be reconstructed. If the object image 10 is recorded under the conditions mentioned above, only information of a part of the point-light-source row m1 (i.e., part of the upper portion of the object image 10) is recorded in the area of the group g1. As a result, a stereoscopic reconstructed image as an original hologram cannot be obtained. Concretely, stereoscopic vision relative to the horizontal direction can be given, but stereoscopic vision relative to the vertical direction becomes insufficient. However, if the object image 10 is recorded under these conditions, a more excellent reconstructed image (i.e., an even clearer reconstructed image including the fact that the stereoscopic vision relative to the vertical direction is insufficient) can be obtained in the reconstructive environment that uses white reconstructing illumination light. The reason is that, when reconstructed, an effect to control the wavelength distribution of the reconstructing light concerning with the vertical direction can be obtained by recording the object image 10 in such a way as to divide it into parts concerning with the vertical direction.

Figure 20:
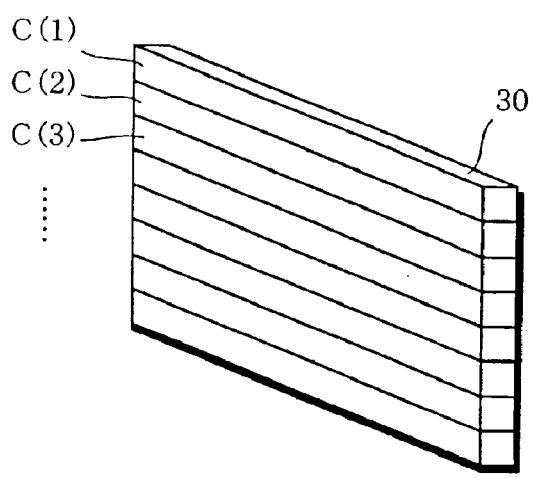
FIG. 20 is a perspective view showing an example in which three-dimensional cells are arranged like a one-dimensional matrix so as to construct a three-dimensional virtual cell set 30.

The present invention was described on the basis of the embodiments shown in the figures. However, the present invention is not limited to these embodiments, and can be carried out in various forms. For example, in the above embodiment, the three-dimensional virtual cell set 30 is defined by arranging three-dimensional cells like a two-dimensional matrix. However, it is also possible to define the three-dimensional virtual cell set 30 by preparing three-dimensional cells that are slender in the horizontal direction as shown in FIG. 20 and arranging the three-dimensional cells like a one-dimensional matrix. In the example of FIG. 20, cells C(1), C(2), C(3), . . . , which are slender in the horizontal direction, are arranged in the vertical direction so as to form the three-dimensional virtual cell set 30. If the object image 10 is recorded onto an optical element that consists of cells arranged like a one-dimensional matrix in this way, only the reconstructed image in which only the stereoscopic vision relative to the vertical direction can be given will be obtained, but this is satisfactorily useful depending on its usage.

The optical element according to the present invention, of course, can be used as a "hologram-recording medium" in which some object image 10 is recorded as a hologram, and then is reconstructed as a stereoscopic image. However, the present invention is not limited to usage as the hologram-recording medium, and can also be applied to a case in which a general optical element, such as an optical filter, a polarized light element, or a light modulating element, is manufactured. For example, if a pattern of a simple lattice design is used as the object image 10, and a complex amplitude distribution of object light emitted from this pattern is recorded onto a physical medium, an optical element with peculiar optical properties can be realized.

Further, the three-dimensional cells are not necessarily needed to be arranged along a rectangular coordinate system. For example, they can also be arranged along a spherical surface by use of a polar coordinate system. Additionally, the three-dimensional physical cells used in the above embodiments are cells serving as passive elements. However, the physical cells used in the present invention may be constructed by active elements capable of controlling the refractive index, transmittance, reflectivity, etc., on the basis of a signal from the outside. For example, if each individual physical cell is made of a birefringent material like a liquid crystal, and the ratio of an ordinary ray to an extraordinary ray is controlled according to an outside signal, the specific amplitude and specific phase of the physical cell can be determined on the basis of a signal given from the outside. In the optical element that uses the active element as a physical cell, since a recorded image is not physically fixed, an arbitrary object image can be reconstructed in accordance with a signal from the outside.

As described above, according to the present invention, high diffraction efficiency can be obtained when reconstructed since an object image is recorded as a complex amplitude distribution of object light, not as interference fringes. Moreover, since the complex amplitude distribution is recorded while employing the optical properties of a three-dimensional cell, an optical element superior in productivity can be provided.

What is claimed is:

1. In an optical element consisting of a set of a plurality of three-dimensional cells and functioning without any electrical driving device, the improvements wherein:

a specific amplitude and a specific phase are defined in each individual cell;

said individual cell has a fixed specific optical property determined by a material or a physical structure so that, when incident light is provided to the cell, emission light is obtained by changing an amplitude and a phase of the incident light in accordance with the specific amplitude and the specific phase defined in the cell; and said individual cell has an amplitude-modulating part having transmittance corresponding to the specific amplitude.

2. The optical element as set forth in claim 1, wherein each cell has a phase-modulating part having a refractive index corresponding to a specific phase.

3. The optical element as set forth in claim 1, wherein each cell has a phase-modulating part having an optical path length corresponding to a specific phase.

4. In an optical element consisting of a set of a plurality of three-dimensional cells and functioning without any electrical driving device, the improvements wherein:

a specific amplitude and a specific phase are defined in each individual cell;

said individual cell has a fixed specific optical property determined by a material or a physical structure so that, when incident light is provided to the cell, emission light is obtained by changing an amplitude and a phase of the incident light in accordance with the specific amplitude and the specific phase defined in the cell; and said individual cell has an amplitude-modulating part having reflectivity corresponding to the specific amplitude.

5. The optical element as set forth in claim 4, wherein each cell has a phase-modulating part having a refractive index corresponding to a specific phase.

6. The optical element as set forth in claim 4, wherein each cell has a phase-modulating part having an optical path length corresponding to a specific phase.

7. In an optical element consisting of a set of a plurality of three-dimensional cells and functioning without any electrical driving device, the improvements wherein:

a specific amplitude and a specific phase are defined in each individual cell;

said individual cell has a fixed specific optical property determined by a material or a physical structure so that, when incident light is provided to the cell, emission light is obtained by changing an amplitude and a phase of the incident light in accordance with the specific amplitude and the specific phase defined in the cell; and said individual cell has an amplitude-modulating part having an effective area corresponding to the specific amplitude.

8. The optical element as set forth in claim 7, wherein each cell has a phase-modulating part having a refractive index corresponding to a specific phase.

9. The optical element as set forth in claim 7, wherein each cell has a phase-modulating part having an optical path length corresponding to a specific phase.

* * * * *